United States Patent
Okazaki et al.

(10) Patent No.: US 11,012,670 B2
(45) Date of Patent: May 18, 2021

(54) LUMINANCE CONTROL DEVICE, IMAGING CONTROL DEVICE, ELECTRONIC MIRROR CONTROL DEVICE, HEAD-UP DISPLAY DEVICE, ON-VEHICLE DISPLAY DEVICE, ON-VEHICLE IMAGING DEVICE, AND ELECTRONIC MIRROR

(71) Applicant: JVCKENWOOD Corporation, Yokohama (JP)

(72) Inventors: Ryuichi Okazaki, Yokohama (JP); Makoto Kurihara, Yokohama (JP)

(73) Assignee: JVCKENWOOD Corporation, Yokohama (JP)

( * ) Notice: Subject to any disclaimer, the term of this patent is extended or adjusted under 35 U.S.C. 154(b) by 0 days.

(21) Appl. No.: 16/702,594

(22) Filed: Dec. 4, 2019

(65) Prior Publication Data
US 2020/0106999 A1   Apr. 2, 2020

Related U.S. Application Data

(63) Continuation of application No. PCT/JP2018/007057, filed on Feb. 26, 2018.

(30) Foreign Application Priority Data

Jun. 20, 2017 (JP) .............................. JP2017-120491
Jun. 29, 2017 (JP) .............................. JP2017-127878
(Continued)

(51) Int. Cl.
*H04N 9/31* (2006.01)
*B60K 35/00* (2006.01)
(Continued)

(52) U.S. Cl.
CPC .......... *H04N 9/3182* (2013.01); *B60K 35/00* (2013.01); *B60R 11/0229* (2013.01);
(Continued)

(58) Field of Classification Search
None
See application file for complete search history.

(56) References Cited

U.S. PATENT DOCUMENTS

2008/0030374 A1* 2/2008 Kumon ................ G06K 9/3241
340/937

FOREIGN PATENT DOCUMENTS

EP     1213702      6/2002
JP     04-127280    4/1992
(Continued)

OTHER PUBLICATIONS

English machine translation of Japanese patent publication JP2013-200218 A. (Year: 2013).*

(Continued)

*Primary Examiner* — Nicholas J Lee
(74) *Attorney, Agent, or Firm* — Amin, Turocy & Watson, LLP

(57) ABSTRACT

A device includes an illuminance information referring unit configured to refer to an illuminance information database that stores therein illuminance information indicating illuminance at each of positions in a lighting device installed place in which lighting devices are installed, an identification information acquiring unit configured to acquire identification information for identifying the lighting device installed place in which a vehicle travel, and a display controller configured to cause a projection device of a head-up display device to project a virtual image. The display controller is further configured to control luminance of the virtual image projected by the projection device in accordance with the illuminance information at each of the positions in the lighting device installed place based on the illuminance information referred to by the illuminance infor- (Continued)

mation referring unit and the identification information acquired by the identification information acquiring unit.

6 Claims, 21 Drawing Sheets

(30) Foreign Application Priority Data

Jun. 30, 2017 (JP) .............................. JP2017-129231
Jul. 6, 2017 (JP) .............................. JP2017-133087

(51) Int. Cl.
*B60R 11/02* (2006.01)
*G02B 27/01* (2006.01)

(52) U.S. Cl.
CPC .. *G02B 27/0101* (2013.01); *B60K 2370/1529* (2019.05); *B60R 2300/205* (2013.01); *G02B 2027/014* (2013.01); *G02B 2027/0118* (2013.01); *G02B 2027/0138* (2013.01)

(56) References Cited

FOREIGN PATENT DOCUMENTS

| JP | 2001-039210 | 2/2001 |
| JP | 2013-200218 | 10/2013 |
| WO | 2013/088511 | 6/2013 |
| WO | 2016/012839 | 1/2016 |

OTHER PUBLICATIONS

Extended European Search Report for European Patent Application No. 18821336.7 dated May 28, 2020.
International Search Report and Written Opinion for International Patent Application No. PCT/JP2018/007057 dated May 15, 2018, 10 pages.

\* cited by examiner

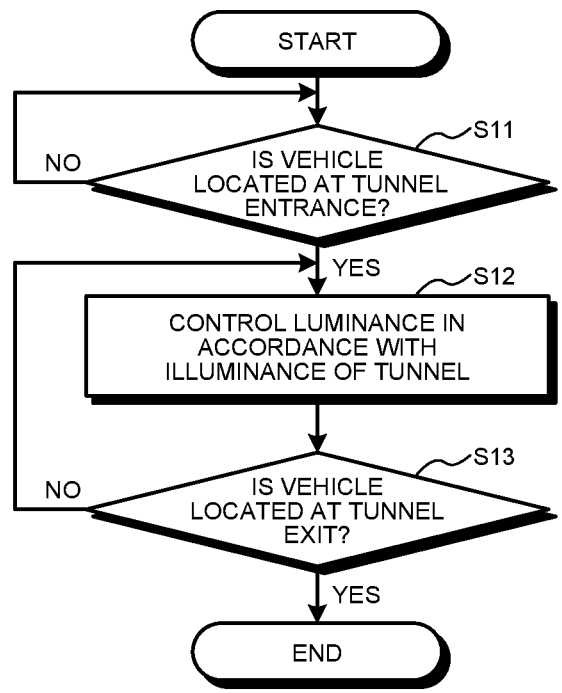
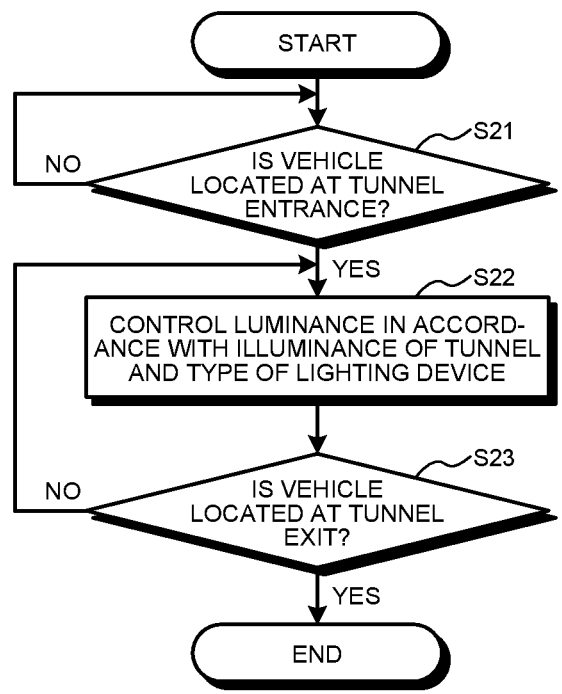

LUMINANCE CONTROL DEVICE, IMAGING CONTROL DEVICE, ELECTRONIC MIRROR CONTROL DEVICE, HEAD-UP DISPLAY DEVICE, ON-VEHICLE DISPLAY DEVICE, ON-VEHICLE IMAGING DEVICE, AND ELECTRONIC MIRROR

CROSS-REFERENCE TO RELATED APPLICATIONS

This application is a Continuation of PCT International Application No. PCT/JP2018/007057 filed in Japan on Feb. 26, 2018, which claims priority to and incorporates by references the entire contents of Japanese Patent Application No. 2017-120491 filed in Japan on Jun. 20, 2017, Japanese Patent Application No. 2017-127878 filed in Japan on Jun. 29, 2017, Japanese Patent Application No. 2017-129231 filed in Japan on Jun. 30, 2017 and Japanese Patent Application No. 2017-133087 filed in Japan on Jul. 6, 2017.

FIELD

The present application relates to a luminance control device, an imaging control device, an electronic mirror control device, a head-up display device, an on-vehicle display device, an on-vehicle imaging device, and an electronic mirror.

BACKGROUND

A technology for automatically turning on a light of a vehicle before the vehicle enters a dark place, such as a tunnel, has been known (for example, see Japanese Laid-open Patent Publication No. 2001-039210 A). A technology described in Japanese Laid-open Patent Publication No. 2001-039210 A is to automatically turn on a light depending on percentage of dark portions in image data of a front view image that is obtained by a video camera. A technology for distinguishing a tunnel by using a one-dimensional imaging device with pixels in a lateral direction that captures a video toward a vehicle traveling direction, and outputting a tunnel detection signal has been known (for example, see Japanese Laid-open Patent Publication No. H04-127280 A). The technology described in Japanese Laid-open Patent Publication No. H04-127280 A is to distinguish a tunnel by binarizing a video signal obtained from the one-dimensional imaging device and processing a binary video signal.

SUMMARY

Visibility of a head-up display device or an on-vehicle display device (on-vehicle display apparatus), an on-vehicle imaging device, or an electronic mirror may be deteriorated depending on illuminance around a vehicle. For example, lighting devices are arranged at intervals in a tunnel, and therefore, illuminance in the tunnel changes depending on positions therein. In a place in which the illuminance changes depending on positions as described above, when a vehicle travels while maintaining constant luminance in the display device or the electronic mirror, the visibility may be deteriorated depending on the positions in the place. Further, when imaging is performed while maintaining a fixed imaging condition in the on-vehicle imaging device, visibility of a captured video may be deteriorated depending on the positions in the place.

A luminance control device, an imaging control device, an electronic mirror control device, a head-up display device, an on-vehicle display device, an on-vehicle imaging device, and an electronic mirror are disclosed.

According to one aspect, there is provided a luminance control device comprising: an illuminance information referring unit configured to refer to an illuminance information database that stores therein illuminance information indicating illuminance at each of positions in a lighting device installed place in which lighting devices are installed; an identification information acquiring unit configured to acquire identification information for identifying the lighting device installed place in which a vehicle travels; and a display controller configured to control a display device that is arranged in the vehicle and that displays information to be provided to a driver, wherein the display controller is further configured to control luminance of the display device in accordance with the illuminance at each of the positions in the lighting device installed place based on the illuminance information referred to by the illuminance information referring unit and the identification information acquired by the identification information acquiring unit.

According to one aspect, there is provided an imaging control device comprising: an illuminance information referring unit configured to refer to an illuminance information database that stores therein illuminance information indicating illuminance at each of positions in a lighting device installed place in which lighting devices are installed; an identification information acquiring unit configured to acquire identification information for identifying the lighting device installed place in which a vehicle travels; and an imaging control device configured to control an imaging condition of an imager that is arranged in the vehicle and that captures a video of surroundings of the vehicle, wherein the imaging condition includes at least one of an aperture value, a shutter speed, and sensitivity, and the imaging control device is further configured to control the imaging condition of the imager in accordance with the illuminance at each of the positions in the lighting device installed place based on the illuminance information referred to by the illuminance information referring unit and the identification information acquired by the identification information acquiring unit.

According to one aspect, there is provided an electronic mirror control device comprising: an illuminance information referring unit configured to refer to an illuminance information database that stores therein illuminance information indicating illuminance at each of positions in a lighting device installed place in which lighting devices are installed; an identification information acquiring unit configured to acquire identification information for identifying the lighting device installed place in which a vehicle travels; a video data acquiring unit configured to acquire video data from a camera unit that is arranged in the vehicle and captures a video of surroundings of the vehicle; and a controller configured to cause an electronic mirror monitor arranged in the vehicle to display a video acquired by the video data acquiring unit, wherein the controller causes the electronic mirror monitor to display a video in which luminance is changed in accordance with the illuminance at each of the positions in the lighting device installed place based on the illuminance information referred to by the illuminance information referring unit and the identification information acquired by the identification information acquiring unit.

The above and other objects, features, advantages and technical and industrial significance of this application will be better understood by reading the following detailed description of presently preferred embodiments of the application, when considered in connection with the accompanying drawings.

BRIEF DESCRIPTION OF THE DRAWINGS

FIG. 5 is a flowchart illustrating a flow of processes performed by the luminance control device according to the first embodiment.

FIG. 6 is a flowchart illustrating a flow of processes performed by a luminance control device according to a second embodiment.

DETAILED DESCRIPTION OF THE PREFERRED ENBODIMENTS

Embodiments of a luminance control device, a head-up display device (hereinafter, referred to as the "HUD device"), a luminance control method, and a program according to the present application will be described in detail below with reference to the accompanying drawings. The present application is not limited by the embodiments below.

First Embodiment

Figure 1:
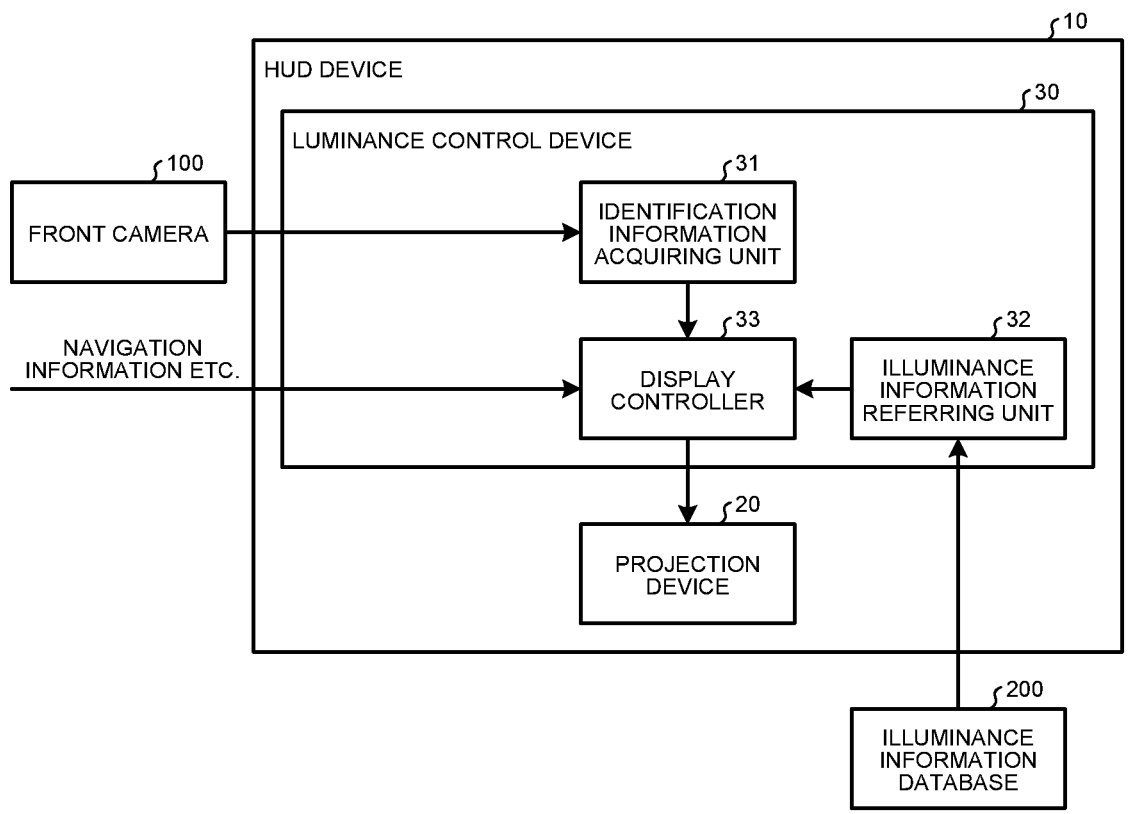
FIG. 1 is a block diagram illustrating a configuration example of a luminance control device according to a first embodiment.

FIG. 1 is a block diagram illustrating a configuration example of a luminance control device according to a first embodiment. In the present embodiment, a luminance control device 30 controls luminance of a virtual image that is projected by a HUD device 10. More specifically, when a vehicle travels in a lighting device installed place, such as a tunnel, the luminance control device 30 changes luminance of a virtual image projected by the HUD device 10 in accordance with a change of illuminance in the lighting device installed place.

A front camera 100 is a front video camera. The front camera 100 is arranged at a front of the vehicle, and captures a video of surroundings around the front of the vehicle. The front camera 100 outputs captured front video data to an identification information acquiring unit 31 of the luminance control device 30. The front video data is, for example, a moving image formed of images of 30 frames per second.

An illuminance information database 200 stores therein illuminance information indicating illuminance at each of positions in the lighting device installed place, in which lighting devices are installed to maintain illuminance around a traveling vehicle. The illuminance information database 200 stores therein, as the illuminance information, brightness that is perceived by human eyes at each of the positions therein. In some cases, the brightness perceived by human eyes may be different from illuminance measured by an illuminance sensor, depending on the positions therein. For example, in the vicinity of a tunnel exit where brightness rapidly changes, human eyes perceive brightness outside the tunnel as higher brightness than that of a middle section of the tunnel. In contrast, a difference between illuminance measured by the illuminance sensor in the vicinity of the tunnel exit and illuminance measured in the middle section of the tunnel is small. In other words, the illuminance measured by the illuminance sensor in the vicinity of the tunnel exit may be different from the brightness perceived by human eyes.

The lighting device installed place includes a place in which a lighting device is always turned on, such as a tunnel, an underground parking, an indoor parking, or an indoor facility equipped with a lighting device that are always turned on and with a passage through which a vehicle travels. The lighting device installed place may include a place in which a lighting device is turned on only at night or in dark surroundings, such as a road including an interchange or a junction in which a lighting device is installed, a bridge including a land bridge, or an outdoor facility equipped with a lighting device and with a passage through which a vehicle travels.

The illuminance information which indicates indicating illuminance at each of positions is information on an illuminance pattern in the lighting device installed place. The illuminance pattern shows illuminance at each of the positions in the lighting device installed place. For example, the illuminance pattern represents a change of the illuminance with respect to a distance from an end of the lighting device installed place on an entrance side. In the illuminance pattern, a high illuminance section and a low illuminance section alternately appear in accordance with an installation interval of the lighting devices.

In the present embodiment, the illuminance information database 200 stores therein, for each of tunnels, a tunnel name, tunnel positional information, a tunnel total length, and the illuminance pattern representing a change of the illuminance with respect to a distance from a tunnel entrance.

Figure 2:
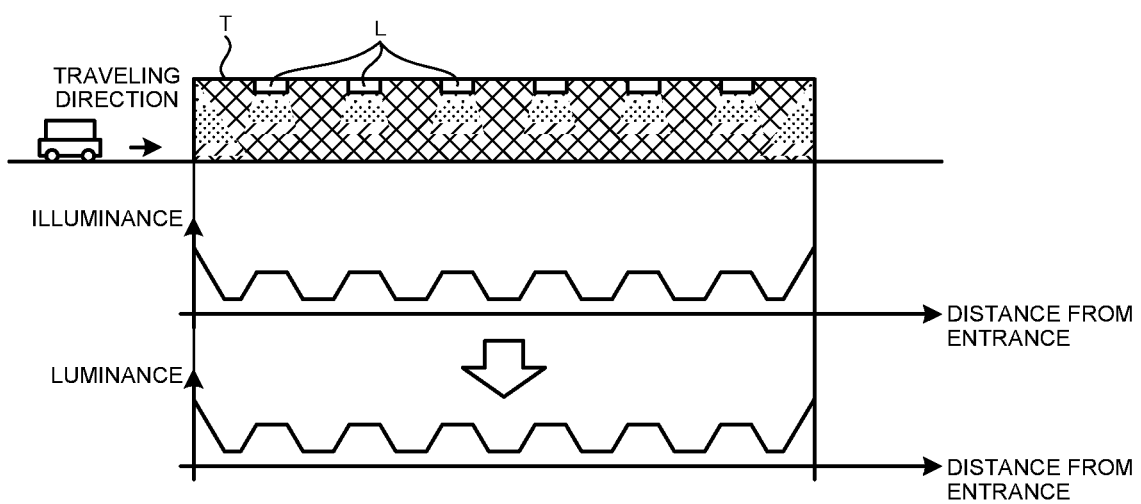
FIG. 2 is a diagram illustrating an example of luminance control based on an illuminance pattern of a tunnel.

Illuminance in a tunnel T will be described with reference to FIG. 2. FIG. 2 is a diagram illustrating an example of luminance control based on the illuminance pattern of the tunnel. In the tunnel T, lighting devices L are arranged at an interval. Illuminance at an entrance and an exit of the tunnel T is higher than illuminance in a middle section of the tunnel T. In other words, the entrance and the exit of the tunnel T are brighter than the middle section of the tunnel T. This is intended to adapt easier to a change in the brightness between the outside and the inside of the tunnel T. In the middle section of the tunnel T, illuminance in a section under the lighting devices L is high and illuminance is reduced according to a distance from the section under the lighting devices L. In the middle section of the tunnel T, a high illuminance section and a low illuminance section alternately appear in accordance with an installation interval of the lighting devices L. The illuminance information database 200 stores therein an illumination pattern of the tunnel T as illustrated in FIG. 2.

The HUD device 10 projects, as a virtual image, information, such as route guide information or speed information, to be provided to a viewer, such as a driver, in front of line of sight of the viewer. When the vehicle travels in the lighting device installed place, the HUD device 10 controls to change luminance of the virtual image in accordance with a change of the illuminance in the lighting device installed place. The HUD device 10 includes a projection device (display device) 20 and the luminance control device 30.

Figure 3:
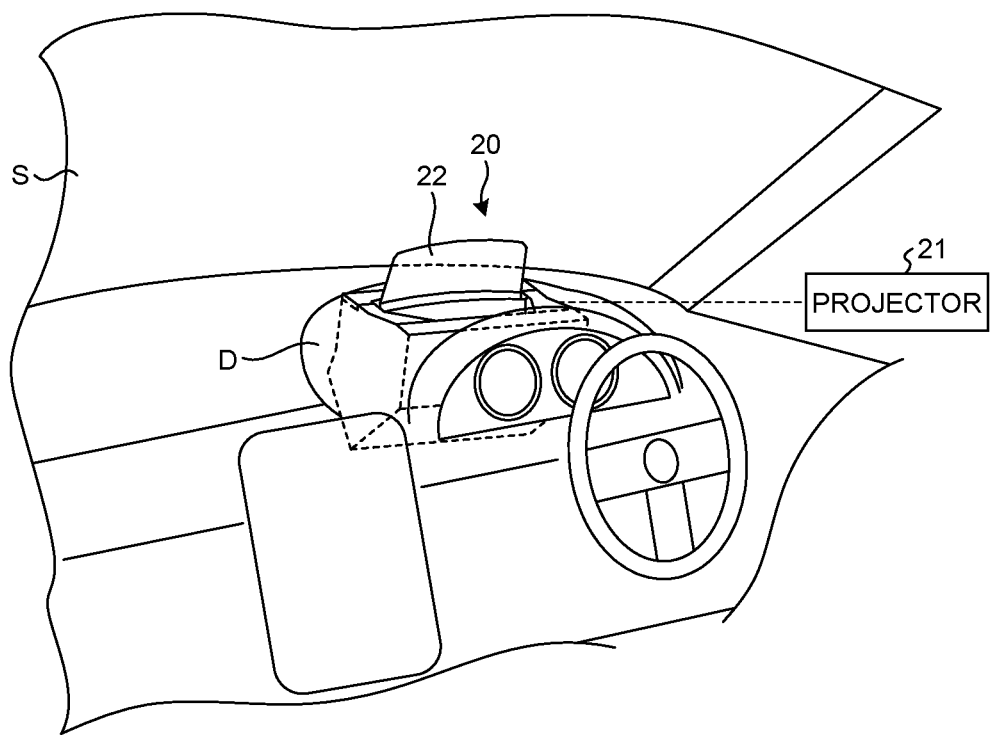
FIG. 3 is a diagram illustrating an example of a projection device of a head-up display device according to the first embodiment.

The projection device 20 will be described with reference to FIG. 3. FIG. 3 is a diagram illustrating an example of the projection device of the head-up display device according to the first embodiment. The projection device 20 includes a projector 21 and a combiner 22. The projection device 20 causes the combiner 22 to reflect a display video projected by the projector 21 and allows the viewer to recognize the display video as a virtual image.

The projector 21 is, for example, a display including a liquid crystal display (LCD), an organic electro-luminescence (EL) display, or the like. In the present embodiment, the projector 21 is arranged below a dashboard D. The projector 21 displays, on a display screen, a display video based on a video signal received from a display controller 33 of the luminance control device 30. Video display light of the display video displayed on the display screen of the projector 21 is projected on the combiner 22.

The combiner 22 reflects the video display light projected from the projector 21 and allows the viewer to recognize the video display light as a virtual image. The combiner 22 is a plate-like member that is arranged in a curved manner so as to protrude forward in the traveling direction. In the present embodiment, the combiner 22 is arranged on an upper part of the dashboard D. The combiner 22 includes a front surface facing a windshield S of the vehicle and a rear surface facing the viewer.

In the projection device 20 configured as described above, luminance of the video display light projected on the combiner 22 is changed in accordance with luminance of the display video displayed on the display screen of the projector 21, and therefore luminance of the virtual image is changed. When the luminance of the display video displayed on the projector 21 is increased, the luminance of the virtual image is increased. When the luminance of the display video displayed on the projector 21 is reduced, the luminance of the virtual image is reduced.

When the vehicle travels in the lighting device installed place, the luminance control device 30 controls the luminance of the display video projected by the projector 21 in accordance with a change of the illuminance in the lighting device installed place. The luminance control device 30 is, for example, an arithmetic processing device including a central processing unit (CPU) or the like. The luminance control device 30 loads a program stored in a storage (not illustrated) onto a memory and executes commands included in the program. The luminance control device 30 includes the identification information acquiring unit 31, an illuminance information referring unit 32, and the display controller 33. The luminance control device 30 includes an internal memory (not illustrated), and the internal memory is used for, for example, temporarily storing data in the luminance control device 30.

The identification information acquiring unit 31 acquires identification information for identifying the lighting device installed place in which the vehicle travels, i.e., which is located in front of the vehicle. The identification information on the lighting device installed place includes, for example, a name for identifying the lighting device installed place, an identification code for identifying the lighting device installed place, or positional information.

In the present embodiment, the identification information acquiring unit 31 is a character recognition unit and recognizes characters that are included as a captured object in the front video data captured by the front camera 100. The identification information acquiring unit 31 acquires, as the identification information, a character string of a tunnel name, such as "ox tunnel", "ox TUNNEL", "ox Tunnel", or "ox underground passageway", from strings of the recognized characters.

Figure 4:
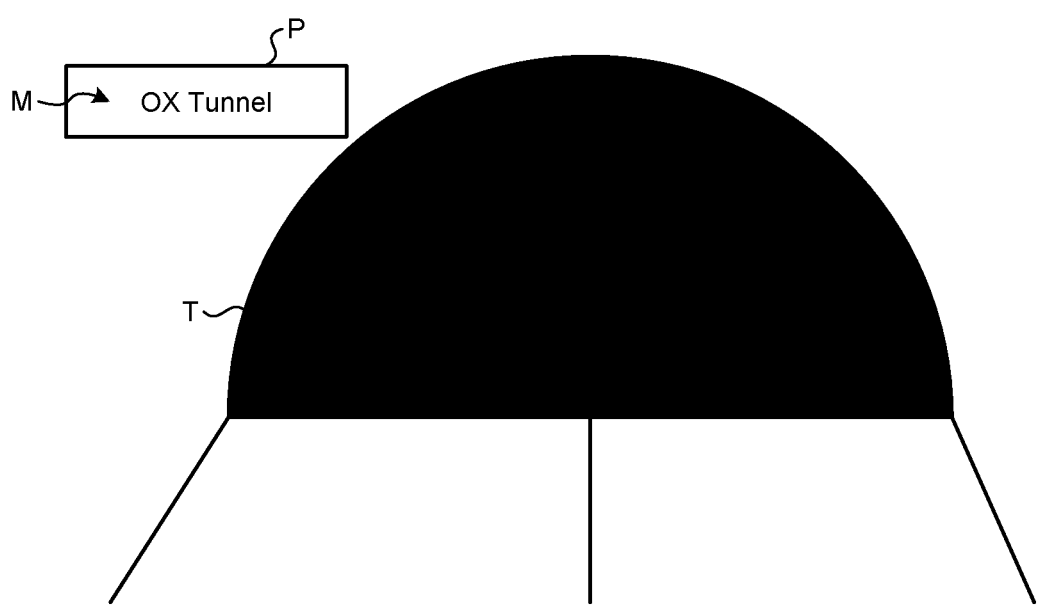
FIG. 4 is a diagram illustrating an example of a tunnel entrance.

Acquisition of the tunnel name will be described with reference to FIG. 4. FIG. 4 is a diagram illustrating an example of a tunnel entrance. A sign panel P indicating a tunnel name is displayed in the front video data that is obtained by capturing a video of the entrance of the tunnel T. The identification information acquiring unit 31 acquires, as the identification information, a character string M of "ox tunnel" from the front video data. The identification information acquiring unit 31 outputs the identified identification information to the display controller 33.

The illuminance information referring unit 32 refers to the illuminance information database 200.

The display controller 33 causes the projection device 20 to project a video that represents information to be provided to the viewer. The information to be provided to the viewer includes, for example, route guide information acquired from a navigation system or speed information on a vehicle speed acquired via a controller area network (CAN).

When the vehicle travels in the lighting device installed place, the display controller 33 performs control so as to change the luminance of the display video projected by the projection device 20 in accordance with the illuminance pattern of the lighting device installed place. More specifically, when the vehicle travels in the lighting device installed place, the display controller 33 acquires the illuminance pattern of the lighting device installed place in which the vehicle travels, based on the identification information acquired by the identification information acquiring unit 31 and the illuminance information referred to by the illuminance information referring unit 32. When a plurality of lighting device installed places with one identical name exist, the display controller 33 acquires the illuminance pattern of the lighting device installed place in which the vehicle travels, based on current location information on the vehicle acquired from a navigation system and positional information on the lighting device installed place stored in the illuminance information database 200. Then, the display controller 33 performs control so as to change the luminance of the display video projected by the projection device 20 in accordance with the illuminance of the current location of the vehicle, based on the acquired current location information on the vehicle and the acquired illuminance pattern of the lighting device installed place.

More specifically, when the vehicle travels in the lighting device installed place, the display controller 33 generates a control signal for controlling luminance of a backlight of the projector 21 in accordance with the illuminance pattern of the lighting device installed place. At a position at which the illuminance is high (hereinafter, referred to as a "high illuminance position"), the display controller 33 outputs a control signal for increasing the luminance of the backlight as compared to a position at which the illuminance is low (hereinafter, referred to as a "low illuminance position"). At the low illuminance position, the display controller 33 outputs a control signal for reducing the luminance of the backlight as compared to the high illuminance position. Meanwhile, the luminance of the display video displayed on the projector 21 becomes higher as the luminance of the backlight becomes higher. The luminance of the display video displayed on the projector 21 becomes lower as the luminance of the backlight becomes lower.

Alternatively, when the vehicle travels in the lighting device installed place, the display controller 33 generates a display video in which the luminance is corrected for each of pixels of the display video in accordance with the illuminance pattern of the lighting device installed place. At the high illuminance position, the display controller 33 generates a display video in which the luminance is increased as compared to the low illuminance position. At the low illuminance position, the display controller 33 generates a display video in which the luminance is reduced as compared to the high illuminance position. The display controller 33 outputs a video signal for projecting the display video with the corrected luminance to the projection device 20.

Furthermore, when the vehicle travels in the lighting device installed place, the display controller 33 may change the luminance of the display video in the same manner as described above only when a background color of the display video is bright. In other words, when the vehicle travels in the lighting device installed place, and when the background color of the display video is black, the display controller 33 need not reduce the luminance even at the low illuminance position. This is because when the background color of the display video is black, visibility of other information members, such as meter display, is not impaired.

As described above, when the vehicle travels in the lighting device installed place, the display controller 33 performs control so as to change the luminance of the display video projected by the projection device 20 in accordance with the illuminance pattern of the lighting device installed place.

In the present embodiment, the display controller 33 causes the projection device 20 to project a route guide video representing the route guide information. More specifically, the display controller 33 acquires the route guide video from the navigation system. Then, the display controller 33 outputs a video signal for projecting the route guide video to the projection device 20.

In the present embodiment, when the vehicle travels in the tunnel as illustrated in FIG. 2, the display controller 33 causes the projection device 20 to project a route guide video in which luminance is changed in accordance with the illuminance of the tunnel referred to by the illuminance information referring unit 32. More specifically, when the vehicle travels in the tunnel, the display controller 33 generates a control signal for controlling the luminance of the backlight such that the luminance of the route guide video projected by the projection device 20 is changed in accordance with the illuminance pattern of the tunnel. For example, at an entrance and an exit of the tunnel, the display controller 33 generates the control signal for maximizing the luminance of the backlight in the tunnel. For example, in the sections under the lighting devices in the middle section of the tunnel, the display controller 33 generates the control signal for reducing the luminance of the backlight as compared to the luminance at the entrance and the exit of the tunnel. For example, at a position distant from the section under the lighting device in the middle section of the tunnel, the display controller 33 generates the control signal for reducing the luminance of the backlight as compared to the luminance in the section under the lighting device.

A flow of processes performed by the luminance control device 30 will be described below with reference to FIG. 5. FIG. 5 is a flowchart illustrating a flow of processes performed by the luminance control device according to the first embodiment. In the present embodiment, a case will be described in which when the vehicle travels in the tunnel, luminance of a virtual image of the route guide image is changed in accordance with the illuminance pattern of the tunnel.

The navigation system is activated and the HUD device 10 is also activated. While the HUD device 10 is activated, the display controller 33 causes the projection device 20 to project a route guide video output from the navigation system. While the HUD device 10 is activated, the identification information acquiring unit 31 acquires front video data captured by the front camera 100.

The luminance control device 30 determines whether the vehicle is located at a tunnel entrance (Step S11). The luminance control device 30 causes the identification information acquiring unit 31 to perform a character recognition process on the front video data captured by the front camera 100, and when the identification information acquiring unit 31 acquires a character string of a tunnel name as a captured object, the luminance control device 30 determines that the vehicle is located at the tunnel entrance (Yes at Step S11). Then, the luminance control device 30 proceeds to Step S12. When the identification information acquiring unit 31 does not acquire a character string of a tunnel name as the captured object (No at Step S11), the luminance control device 30 determines that the vehicle is not located at the tunnel entrance. Then, the luminance control device 30 performs the process at Step S11 again.

When it is determined that the vehicle is not located at the tunnel entrance (No at Step S11), the luminance control device 30 causes the display controller 33 to cause the projection device 20 to project the route guide video output from the navigation system without controlling the luminance thereof.

When it is determined that the vehicle is located at the tunnel entrance (Yes at Step S11), the luminance control device 30 controls the luminance in accordance with the illuminance of the tunnel (Step S12). More specifically, the luminance control device 30 causes the display controller 33 to acquire the illuminance pattern of the tunnel in which the vehicle travels, based on the identification information acquired by the identification information acquiring unit 31 and the illuminance information referred to by the illuminance information referring unit 32. Then, the luminance control device 30 causes the display controller 33 to generate a control signal for controlling the luminance of the backlight such that the luminance of the route guide video projected by the projection device 20 is changed in accordance with the illuminance of the current location of the vehicle, based on the current location information on the vehicle acquired from the navigation system and the acquired illuminance pattern. The luminance control device 30 causes the display controller 33 to output the control signal for controlling the luminance of the backlight to the projection device 20. The luminance control device 30 proceeds to Step S13.

The luminance control device 30 determines whether the vehicle is located at a tunnel exit (Step S13). For example, when the current location of the vehicle is outside a range of the positional information on the tunnel, the luminance control device 30 determines that the vehicle is located at the tunnel exit. Alternatively, for example, when the luminance control device 30 determines that a travel distance of the vehicle from the tunnel entrance is equal to or longer than a total length of the tunnel based on vehicle information acquired via the CAN, the luminance control device 30 determines that the vehicle is located at the tunnel exit. When the current location of the vehicle is the tunnel exit (Yes at Step S13), the luminance control device 30 terminates the process and terminates control of changing the luminance of the virtual image in accordance with the illuminance pattern of the tunnel. When the current location of the vehicle is not the tunnel exit (No at Step S13), the luminance control device 30 performs the process at Step S12 again.

In this manner, when the vehicle travels in the tunnel, the luminance of the route guide video projected by the projector 21 is changed in accordance with the illuminance of the tunnel. Therefore, the luminance of the virtual image reflected by the combiner 22 is changed in accordance with the illuminance of the tunnel. For example, at the tunnel entrance, the luminance of the route guide video projected by the projector 21 is maximized in the tunnel, so that the luminance of the virtual image reflected by the combiner 22 is maximized. For example, in the section under the lighting device in the middle section of the tunnel, by reducing the luminance of the route guide video projected by the projector 21 as compared to the tunnel entrance, the luminance of the virtual image reflected by the combiner 22 is reduced as compared to the tunnel entrance. For example, at a position distant from the section under the lighting device in the middle section of the tunnel, by reducing the luminance of the route guide video projected by the projector 21 as compared to the section under the lighting device, the luminance of the virtual image reflected by the combiner 22 is reduced as compared to the section under the lighting device.

As described above, in the present embodiment, when the vehicle travels in the lighting device installed place, the luminance of the display video projected by the projector 21 is changed in accordance with the illuminance pattern of the lighting device installed place. Therefore, according to the present embodiment, when the vehicle travels in the lighting device installed place, the luminance of the virtual image reflected by the combiner 22 is changed in accordance with the illuminance pattern of the lighting device installed place. More specifically, in the present embodiment, when the vehicle travels in the lighting device installed place, the luminance of the virtual image is increased at the high illuminance position and the luminance of the virtual image is reduced at the low illuminance position. In this manner, in the present embodiment, when the vehicle travels in the lighting device installed place, the luminance of the virtual image is changed in accordance with a change of the illuminance around the vehicle, so that it is possible to suppress deterioration of visibility of the HUD device 10. In other words, according to the present embodiment, when the vehicle travels in the lighting device installed place, it is possible to maintain high visibility of the HUD device 10 independently of a change of the illuminance around the vehicle.

When the luminance of the display video projected by the projector 21 is not changed when the vehicle travels in the lighting device installed place, and when, for example, the luminance of the virtual image is low at the high illuminance position, the visibility of the virtual image may be deteriorated. For example, when the luminance of the virtual image is high at the low illuminance position, it may become difficult to view the front of the vehicle through the windshield S.

In contrast, according to the present embodiment, when the vehicle travels in the lighting device installed place, the luminance of the virtual image is appropriately controlled in accordance with the illuminance around the vehicle, so that it is possible to maintain high visibility of the virtual image even when the illuminance around the vehicle changes.

Further, in the present embodiment, the luminance of the virtual image is appropriately controlled in accordance with the illuminance around the vehicle, so that even when the illuminance around the vehicle is low, it is possible to prevent difficulty in viewing the front of the vehicle through the windshield S.

In the present embodiment, the illuminance information database 200 stores therein the illuminance pattern in which illuminance at an entrance and an exit of a tunnel is higher than illuminance in a middle section of the tunnel. In the present embodiment, luminance is controlled such that luminance at the entrance and the exit of the tunnel becomes higher than luminance in the middle section of the tunnel. Therefore, in the present embodiment, it is possible to suppress deterioration of the visibility of the HUD device 10 at the entrance and the exit of the tunnel.

In the present embodiment, brightness that is perceived by human eyes at each of positions in the lighting device installed place is stored, as the illuminance information, in the illuminance information database 200. The illuminance pattern stored in the illuminance information database 200 retains illuminance that is close to the brightness perceived by human eyes even in the vicinity of the tunnel exit, unlike illuminance measured by the illuminance sensor. Therefore, according to the present embodiment, even in the vicinity of the tunnel exit, it is possible to appropriately control the luminance of the virtual image in accordance with the illuminance pattern of the brightness perceived by human eyes. In this manner, according to the present embodiment, even in a place, such as in the vicinity of the tunnel exit, in which the illuminance rapidly changes, it is possible to control luminance in accordance with brightness perceived by human eyes. In the present embodiment, even in a place, such as in the vicinity of the tunnel exit, in which the illuminance rapidly changes, it is possible to suppress deterioration of the visibility of the HUD device 10.

Second Embodiment

A HUD device 10 according to a second embodiment will be described with reference to FIG. 6. FIG. 6 is a flowchart illustrating a flow of processes performed by a luminance control device according to the second embodiment. A basic configuration of the HUD device 10 is the same as the HUD device 10 of the first embodiment. In the following description, the same components as those of the HUD device 10 are denoted by the same or corresponding reference symbols, and detailed explanation thereof will be omitted. The same applies to other embodiments below.

The illuminance information database 200 further stores therein, as the illuminance information, a light source type of the lighting device. The light source type is, for example, a sodium-vapor lamp, a white LED, or the like. The sodium-vapor lamp emits orange light. The white light emitting diode (LED) realizes uniform brightness as compared to the sodium-vapor lamp.

When the vehicle travels in the lighting device installed place, the display controller 33 controls the luminance of the virtual image projected by the projection device 20 in accordance with the illuminance at each of positions in the lighting device installed place and the light source type of the lighting device, based on the illuminance information referred to by the illuminance information referring unit 32 and the identification information acquired by the identification information acquiring unit 31. More specifically, when the vehicle travels in the lighting device installed place, the display controller 33 performs control so as to change the luminance of the display video projected by the projection device 20 in accordance with the illuminance pattern of the lighting device installed place and the light source type.

For example, when the light source type is a sodium-vapor lamp, the display controller 33 performs control so as to change the luminance of the display video projected by the projection device 20 such that the visibility of the virtual image is not deteriorated even under orange illumination light. For example, when the light source type is a white LED, the display controller 33 performs control so as to change the luminance of the display video projected by the projection device 20 such that the visibility of the virtual image is not deteriorated even under illumination light of the white LED.

A flow of processes performed by the luminance control device 30 will be described with reference to FIG. 6. Processes at Step S21 and Step S23 are performed in the same manner as the processes at Step S11 and Step S13 in the flowchart illustrated in FIG. 5.

When it is determined that the vehicle is located at the tunnel entrance (Yes at Step S21), the luminance control device 30 controls the luminance in accordance with the illuminance of the tunnel and the light source type (Step S22). More specifically, the luminance control device 30 causes the display controller 33 to generate a control signal for controlling the luminance of the backlight such that the luminance of the route guide video projected by the projection device 20 is changed in accordance with the illuminance of the current location of the vehicle and the light source type, based on the current location information on the vehicle, the acquired illuminance pattern, and the acquired light source type. The luminance control device 30 causes the display controller 33 to output the control signal for controlling the luminance of the backlight to the projection device 20. The luminance control device 30 proceeds to Step S23.

As described above, in the present embodiment, when the vehicle travels in the lighting device installed place, by changing the luminance of the virtual image in accordance with a change of the illuminance around the vehicle and the light source type, it is possible to suppress deterioration of the visibility of the HUD device 10. In other words, according to the present embodiment, when the vehicle travels in the lighting device installed place, it is possible to maintain high visibility of the HUD device 10 independently of a change of the illuminance around the vehicle and the light source type.

Third Embodiment

Figure 7:
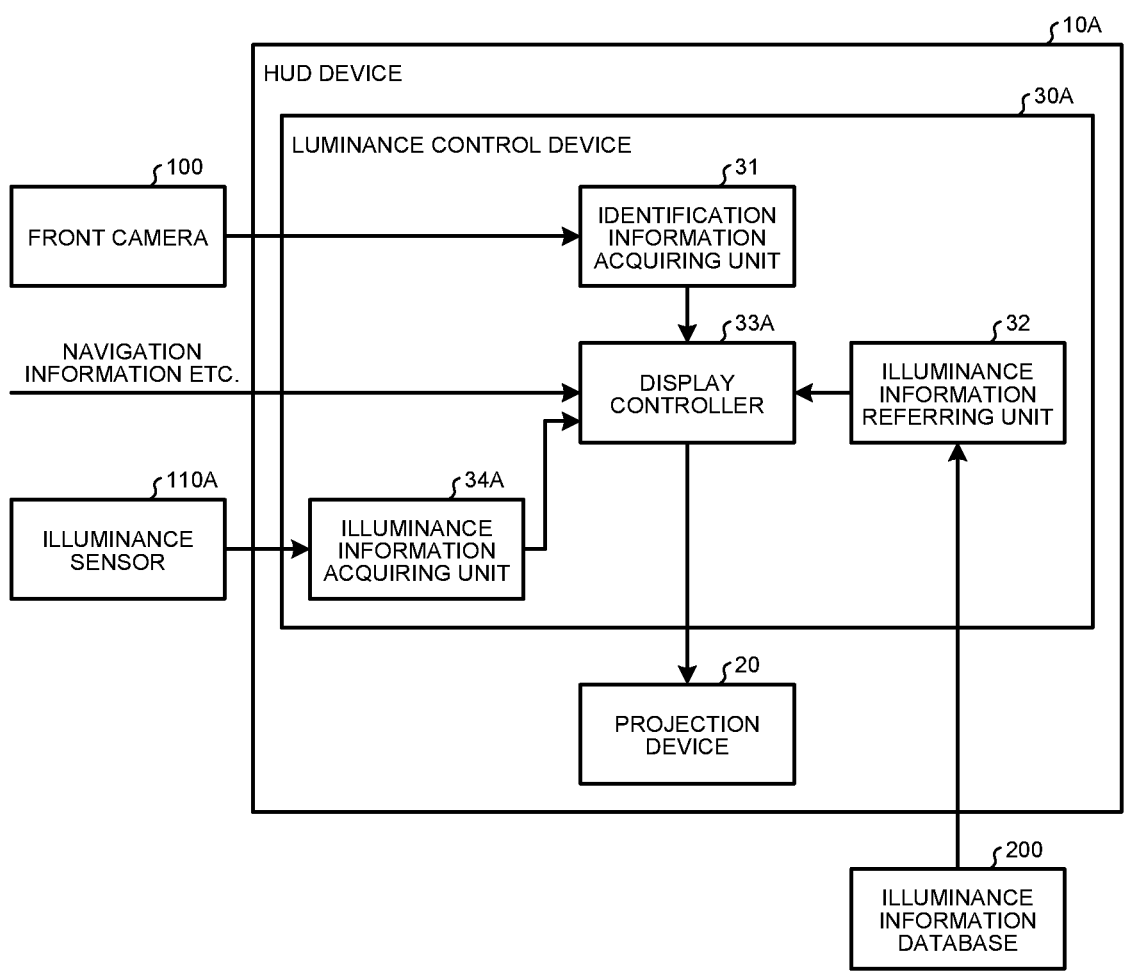
FIG. 7 is a block diagram illustrating a configuration example of a luminance control device according to a third embodiment.
Figure 8:
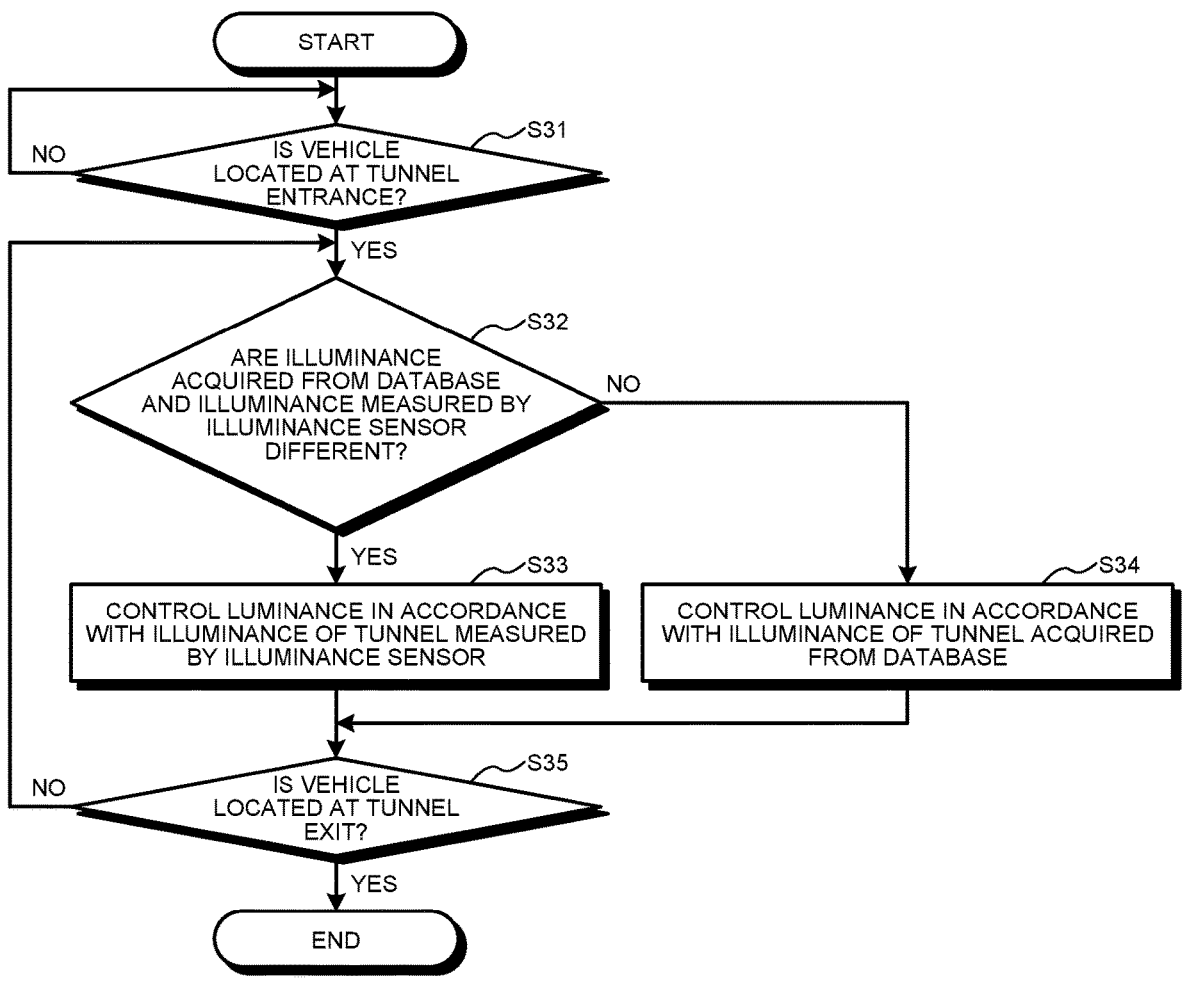
FIG. 8 is a flowchart illustrating a flow of processes performed by the luminance control device according to the third embodiment.
Figure 9:
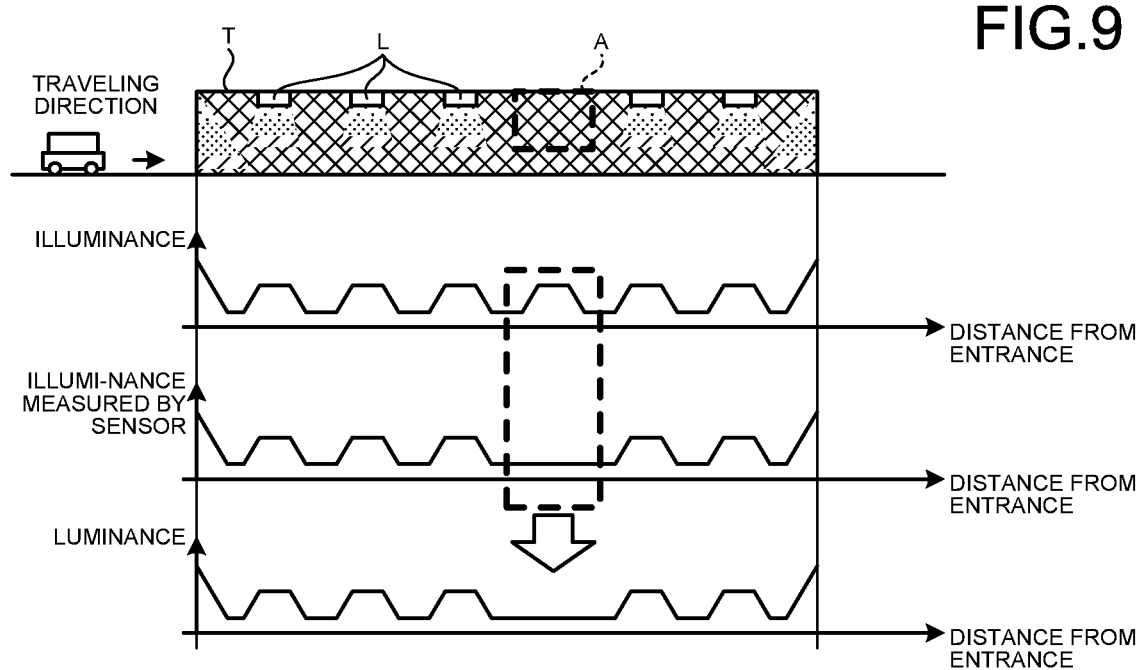
FIG. 9 is a diagram illustrating an example of luminance control based on illuminance of a tunnel measured by a sensor.

A HUD device 10A according to a third embodiment will be described with reference to FIG. 7 to FIG. 9. FIG. 7 is a block diagram illustrating a configuration example of a luminance control device according to the third embodiment. FIG. 8 is a flowchart illustrating a flow of processes performed by the luminance control device according to the third embodiment. FIG. 9 is a diagram illustrating an example of luminance control based on illuminance of a tunnel measured by a sensor. A basic configuration of the HUD device 10A is the same as the HUD device 10 of the first embodiment.

An illuminance sensor 110A is arranged on the front of the vehicle and measures illuminance of an upper front of the vehicle. The illuminance sensor 110A outputs a measurement result to an illuminance information acquiring unit 34A of a luminance control device 30A.

The HUD device 10A is different from the first embodiment in that the luminance control device 30A includes the illuminance information acquiring unit 34A and a display controller 33A performs a different process.

The illuminance information acquiring unit 34A acquires the illuminance of the upper front of the vehicle from the measurement result obtained by the illuminance sensor 110A. The illuminance information acquiring unit 34A outputs the acquired illuminance to the display controller 33A.

At a position at which the illuminance of the illuminance information in the referred illuminance information database 200 and the illuminance of the measurement result of the illuminance sensor 110A are different, the display controller 33A performs control so as to change the luminance of the display video projected by the projection device 20 in accordance with the illuminance of the measurement result, based on the illuminance information referred to by the illuminance information referring unit 32, the identification information acquired by the identification information acquiring unit 31, and the measurement result acquired by the illuminance information acquiring unit 34A.

A flow of processes performed by the luminance control device 30A will be described below with reference to FIG. 8. Processes at Step S31, Step S34, and Step S35 are performed in the same manner as the processes at Step S11, Step S12, and Step S13 in the flowchart illustrated in FIG. 5.

The luminance control device 30A determines whether the illuminance in the referred illuminance information database 200 and the illuminance measured by the illuminance sensor 110A are different (Step S32). More specifically, in the current location of the vehicle, when the illuminance of the illuminance information in the referred illuminance information database 200 and the illuminance of the measurement result acquired by the illuminance information acquiring unit 34A are different (Yes at Step S32), the luminance control device 30A proceeds to Step S33. When the illuminance of the illuminance information in the referred illuminance information database 200 and the illuminance of the measurement result acquired by the illuminance information acquiring unit 34A are not different (No at Step S32), the luminance control device 30A proceeds to Step S34.

At the position at which it is determined as Yes at Step S32, the luminance control device 30A controls the luminance in accordance with the illuminance measured by the illuminance sensor 110A (Step S33). More specifically, the luminance control device 30A causes the display controller 33A to generate a control signal for controlling the luminance of the backlight such that the luminance of the route guide video projected by the projection device 20 is changed in accordance with the illuminance of the measurement result acquired by the illuminance information acquiring unit 34A. The luminance control device 30A causes the display controller 33A to output the control signal for controlling the luminance of the backlight to the projection device 20. The luminance control device 30A proceeds to Step S35.

At the position at which it is determined as NO at Step S32, the luminance control device 30A controls the luminance in accordance with the illuminance of the illuminance information in the referred illuminance information database 200 (Step S34).

A case in which the illuminance in the referred illuminance information database 200 and the illuminance measured by the illuminance sensor 110A are different will be described with reference to FIG. 9. The illuminance information database 200 stores therein an illuminance pattern of a state in which all of the lighting devices L are turned on. In the tunnel T, a lighting device A that is not turned on due to a temporary defect is present. Therefore, in the section under the lighting device A that is not turned on, the illuminance measured by the illuminance sensor 110A is lower than the illuminance in the section under the lighting device L that are turned on. At a position under the lighting device A that is not turned on, the illuminance stored in the illuminance information database 200 and the illuminance measured by the illuminance sensor 110A are different. At the position under the lighting device A that is not turned on, the luminance is controlled in accordance with the illuminance measured by the illuminance sensor 110A. At other positions, the luminance is controlled in accordance with the illuminance pattern acquired from the illuminance information database 200.

In this manner, when the vehicle travels in the tunnel, at the position at which the illuminance in the referred illuminance information database 200 and the illuminance measured by the illuminance sensor 110A are different, the luminance is controlled in accordance with the illuminance measured by the illuminance sensor 110A. For example, in the section under the lighting device A that is not turned on as illustrated in FIG. 9, the luminance is controlled in accordance with the illuminance measured by the illuminance sensor 110A. Thus, even at a position at which actual illuminance is different from the illuminance in the illuminance information database 200, the luminance of the virtual image reflected by the combiner 22 is appropriately changed in accordance with the illuminance measured by the illuminance sensor 110A.

As described above, in the present embodiment, at the position at which the illuminance in the referred illuminance information database 200 and the illuminance measured by the illuminance sensor 110A are different, the luminance of the display video projected by the projector 21 is changed in accordance with the illuminance measured by the illuminance sensor 110A. In the present embodiment, for example, in the section under the lighting device A that is not turned on as illustrated in FIG. 9, the luminance is controlled in accordance with the illuminance measured by the illuminance sensor 110A. Therefore, in the present embodiment, even at the position at which the lighting device is not turned on, it is possible to change the luminance of the virtual image reflected by the combiner 22 in accordance with accurate illuminance measured by the illuminance sensor 110A. In this manner, in the present embodiment, it is possible to more appropriately suppress deterioration of the visibility of the HUD device 10 due to a change of the illuminance around the vehicle.

In contrast, when the luminance is changed in accordance with the illuminance in the illuminance information database 200 in the section under the lighting device A that is not turned on as illustrated in FIG. 9, a virtual image with increased luminance is displayed even though the vehicle is in dark surroundings. In this case, it may become difficult to view the front of the vehicle through the windshield S.

Fourth Embodiment

Figure 10:
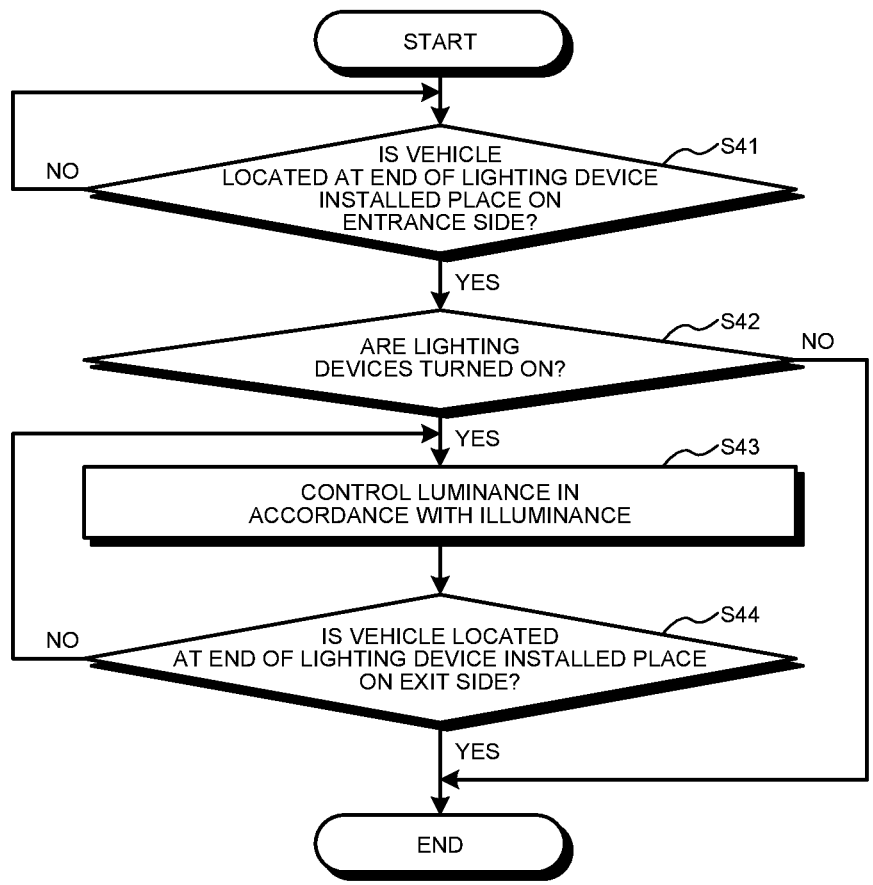
FIG. 10 is a flowchart illustrating a flow of processes performed by a luminance control device according to a fourth embodiment.

A HUD device 10 according to a fourth embodiment will be described with reference to FIG. 10. FIG. 10 is a flowchart illustrating a flow of processes performed by a luminance control device according to the fourth embodiment. The HUD device 10 is different from the first embodiment mainly in that the display controller 33 performs a different process.

When the lighting device installed place is a place in which the lighting devices are turned on only at night or in dark surroundings, the illuminance information database 200 stores therein a lighting condition of the lighting devices. The lighting condition of the lighting devices is, for example, a time of day in which the lighting devices are turned on or a threshold for illuminance at which the lighting devices are turned on.

When the vehicle travels in the lighting device installed place, and when the lighting devices are turned on, the display controller 33 performs control so as to change the luminance of the display video projected by the projection device 20 in accordance with the illuminance pattern of the lighting device installed place.

A flow of processes performed by the luminance control device 30 will be described below with reference to FIG. 10. Processes at Step S41, Step S43, and Step S44 are performed in the corresponding manner as the processes at Step S11, Step S12, and Step S13 in the flowchart illustrated in FIG. 5.

The luminance control device 30 determines whether the lighting devices are turned on (Step S42). The luminance control device 30 determines whether the lighting devices are turned on based on, for example, whether the lighting condition of the lighting devices is satisfied. When the lighting condition of the lighting devices is satisfied (Yes at Step S42), the luminance control device 30 proceeds to Step S43. When the lighting condition of the lighting devices is not satisfied (No at Step S42), the luminance control device 30 terminates the process.

As described above, in the present embodiment, even when the lighting device installed place is a place in which the lighting devices are turned on only at night or in dark surroundings, it is possible to appropriately suppress deterioration of the visibility of the HUD device 10.

Fifth Embodiment

Figure 11:
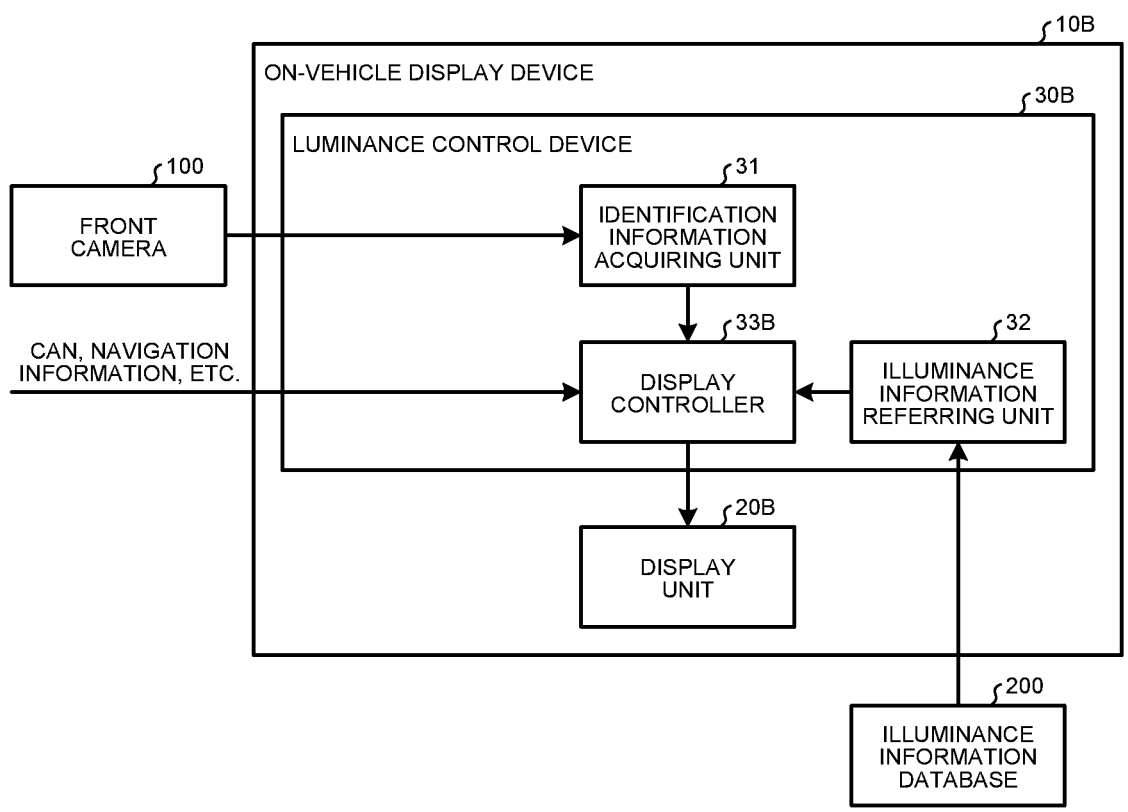
FIG. 11 is a block diagram illustrating a configuration example of a luminance control device according to a fifth embodiment.
Figure 12:
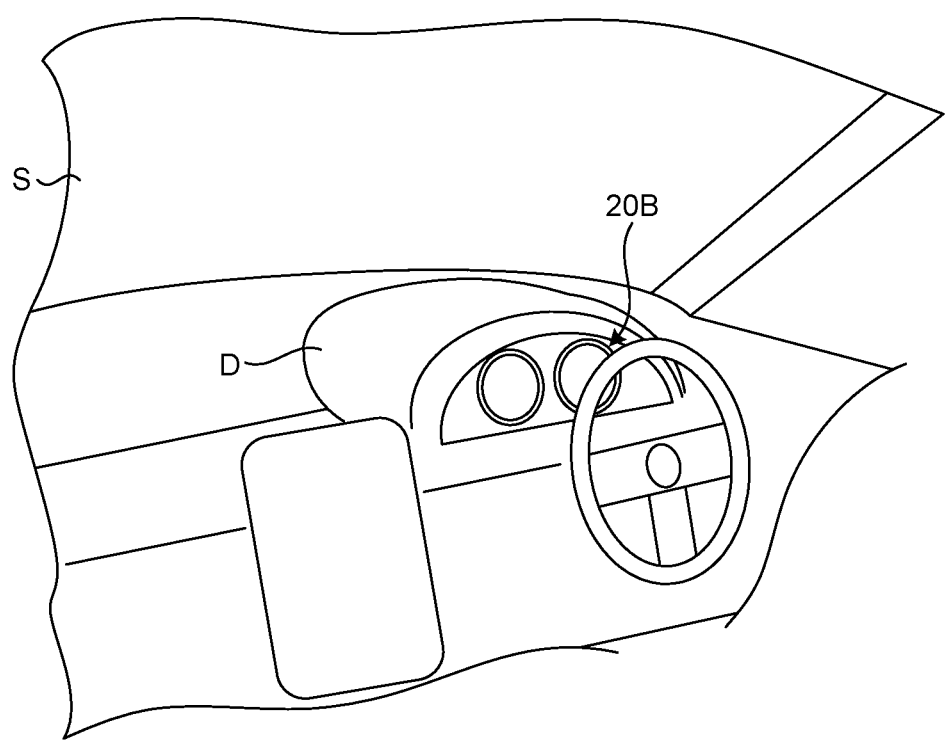
FIG. 12 is a diagram illustrating an example of a display device of an on-vehicle display device according to the fifth embodiment.
Figure 13:
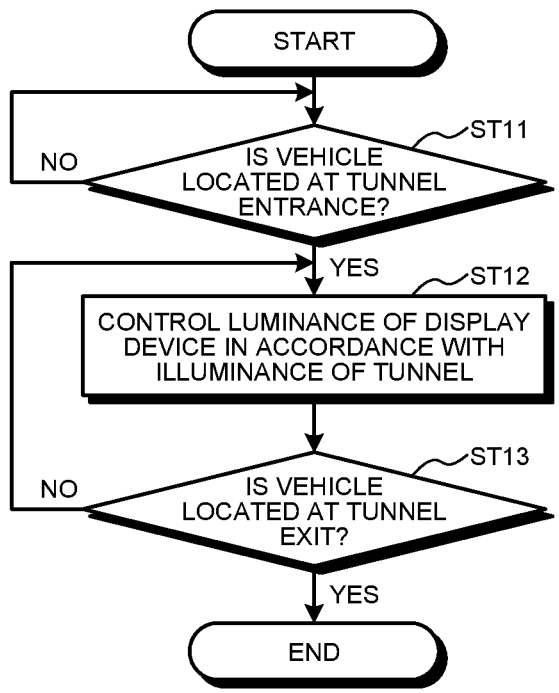
FIG. 13 is a flowchart illustrating a flow of processes performed by the luminance control device according to the fifth embodiment.

An on-vehicle display device 10B according to a fifth embodiment will be described with reference to FIG. 11 to FIG. 13. FIG. 11 is a block diagram illustrating a configuration example of a luminance control device according to the fifth embodiment. FIG. 12 is a diagram illustrating an example of a display device of the on-vehicle display device according to the fifth embodiment. FIG. 13 is a flowchart illustrating a flow of processes performed by the luminance control device according to the fifth embodiment. A luminance control device 30B is different from the first embodiment in that it controls luminance of a display video displayed by a display unit 20B of the on-vehicle display device 10B. More specifically, when a vehicle travels in a lighting device installed place, such as a tunnel, the luminance control device 30B performs control so as to change the luminance of the display video displayed on the display unit 20B of the on-vehicle display device 10B, in accordance with a change of the illuminance in the lighting device installed place.

The on-vehicle display device 10B displays, as the display video, information to be provided to a viewer, such as instrument information including at least one of a speedometer and a tachometer acquired via the CAN or the route guide information, on the display unit 20B. When the vehicle travels in the lighting device installed place, the on-vehicle display device 10B performs control so as to change the luminance of the display device in accordance with a change of the illuminance in the lighting device installed place. The on-vehicle display device 10B includes the display unit 20B and the luminance control device 30B.

The display unit 20B will be described with reference to FIG. 12. The display unit 20B displays, for example, information to be provided to the viewer, such as the instrument information or the route guide information. The display unit 20B displays the display video based on a video signal obtained from the display controller 33B of the luminance control device 30B. The display unit 20B is, for example, a display including a liquid crystal display, an organic EL display, or the like. The display unit 20B is, for example, a digital instrument panel arranged on an instrument panel. The display unit 20B is, for example, a display device arranged in a center console.

When the vehicle travels in the lighting device installed place, the luminance control device 30B controls the luminance of the display video displayed on the display unit 20B, in accordance with a change of the illuminance in the lighting device installed place. The luminance control device 30B performs the same process as the process that the luminance control device 30 of the first embodiment performs for controlling the luminance of the display video projected by the projector 21, in order to control the luminance of the display video displayed on the display unit 20B.

A display controller 33B causes the display unit 20B to display, as the display video, the information to be provided to the viewer, such as the instrument information or the route guide information.

When the vehicle travels in the lighting device installed place, the display controller 33B performs control so as to change the luminance of the display video displayed on the display unit 20B in accordance with the illuminance pattern of the lighting device installed place.

More specifically, when the vehicle travels in the lighting device installed place, the display controller 33B generates a control signal for controlling luminance of a backlight of the display unit 20B in accordance with the illuminance pattern of the lighting device installed place. Meanwhile, the luminance of the display video displayed on the display unit 20B becomes higher as the luminance of the backlight becomes higher. The luminance of the display video displayed on the display unit 20B becomes lower as the luminance of the backlight becomes lower.

In the present embodiment, the display controller 33B causes the display unit 20B to display an instrument panel video representing the instrument information. More specifically, the display controller 33B acquires the instrument information via the CAN. Then, the display controller 33B generates an instrument panel video corresponding to the instrument information. Then, the display controller 33B outputs a video signal representing the instrument panel video to the display unit 20B.

A flow of processes performed by the luminance control device 30B will be described below with reference to FIG. 13. In the present embodiment, a case will be described in which when the vehicle travels in the tunnel, the luminance of the instrument panel video displayed on the display unit 20B is changed in accordance with the illuminance pattern of the tunnel. A process at Step ST11 is performed in the same manner as the process at Step S11 in the flowchart illustrated in FIG. 5.

While the on-vehicle display device 10B is activated, the luminance control device 30B displays the instrument panel video acquired via the CAN on the display unit 20B. While the on-vehicle display device 10B is activated, the identification information acquiring unit 31 acquires the front video data captured by the front camera 100.

When it is determined that the vehicle is not located at the tunnel entrance (No at Step ST11), the luminance control device 30B causes the display unit 20B to display the generated instrument panel video without controlling the luminance of the backlight.

When it is determined that the vehicle is located at the tunnel entrance (Yes at Step ST11), the luminance control device 30B controls the luminance in accordance with the illuminance of the tunnel (Step ST12). More specifically, the luminance control device 30B causes the display controller 33B to acquire an illuminance pattern of the tunnel in which the vehicle travels, based on the identification information acquired by the identification information acquiring unit 31 and the illuminance information referred to by the illuminance information referring unit 32. Then, the luminance control device 30B causes the display controller 33B to generate a control signal for controlling the luminance of the backlight such that the luminance of the instrument panel video displayed on the display unit 20B is changed in accordance with the illuminance of the current location of the vehicle, based on the current location information on the vehicle acquired from the navigation system and the acquired illuminance pattern. The luminance control device 30B causes the display controller 33B to output the control signal for controlling the luminance of the backlight to the display unit 20B. The luminance control device 30B proceeds to Step ST13.

The luminance control device 30B determines whether the vehicle is located at the tunnel exit (Step ST13). When the current location of the vehicle is the tunnel exit (Yes at Step ST13), the luminance control device 30B terminates the process and terminates the control of changing the luminance of the instrument panel video displayed on the display unit 20B in accordance with the illuminance pattern of the tunnel. When the current location of the vehicle is not the tunnel exit (No at Step ST13), the luminance control device 30B performs the process at Step ST12 again.

In this manner, when the vehicle travels in the tunnel, the luminance of the instrument panel video displayed on the display unit 20B is changed in accordance with the illuminance of the tunnel. For example, at the tunnel entrance, the luminance of the instrument panel video displayed on the display unit 20B is maximized in the tunnel. For example, in the section under the lighting device in the middle section of the tunnel, the luminance of the instrument panel video displayed on the display unit 20B is reduced as compared to the luminance at the tunnel entrance. For example, at a position distant from the section under the lighting device in the middle section of the tunnel, the luminance of the instrument panel video displayed on the display unit 20B is reduced as compared to the section under the lighting device.

As described above, in the present embodiment, when the vehicle travels in the lighting device installed place, the luminance of the display video displayed on the display unit 20B is changed in accordance with the illuminance pattern of the lighting device installed place. More specifically, in the present embodiment, when the vehicle travels in the lighting device installed place, the luminance of the display video is increased at the high illuminance position, and the luminance of the display video is reduced at the low illuminance position. In this manner, in the present embodiment, when the vehicle travels in the lighting device installed place, by changing the luminance of the display video in accordance with a change of the illuminance around the vehicle, it is possible to suppress deterioration of the visibility of the on-vehicle display device 10B. In other words, according to the present embodiment, when the vehicle travels in the lighting device installed place, it is possible to maintain high visibility of the on-vehicle display device 10B independently of the illuminance around the vehicle.

When the luminance of the display video displayed on the display unit 20B is not changed when the vehicle travels in the lighting device installed place, and when, for example, the luminance of the display video at the high illuminance position is low, the visibility of the display video may be deteriorated. For example, when the luminance of the display video is high at the low illuminance position, the display video may appear in the windshield S and it may become difficult to view the front of the vehicle.

In contrast, according to the present embodiment, when the vehicle travels in the lighting device installed place, the luminance of the display video is appropriately controlled in accordance with the illuminance around the vehicle, so that even when the illuminance around the vehicle is changed, it is possible to maintain high visibility of the display video. Further, in the present embodiment, the luminance of the display video is appropriately controlled in accordance with the illuminance around the vehicle, so that even when the illuminance around the vehicle is low, it is possible to prevent difficulty in viewing the front of the vehicle through the windshield S.

According to the present embodiment, even in the vicinity of the tunnel exit, it is possible to appropriately control the luminance of the display video in accordance with an illuminance pattern of brightness perceived by human eyes. In the present embodiment, even in a place, such as in the vicinity of the tunnel exit, in which the illuminance rapidly changes, it is possible to suppress deterioration of the visibility of the on-vehicle display device 10B.

Sixth Embodiment

Figure 14:
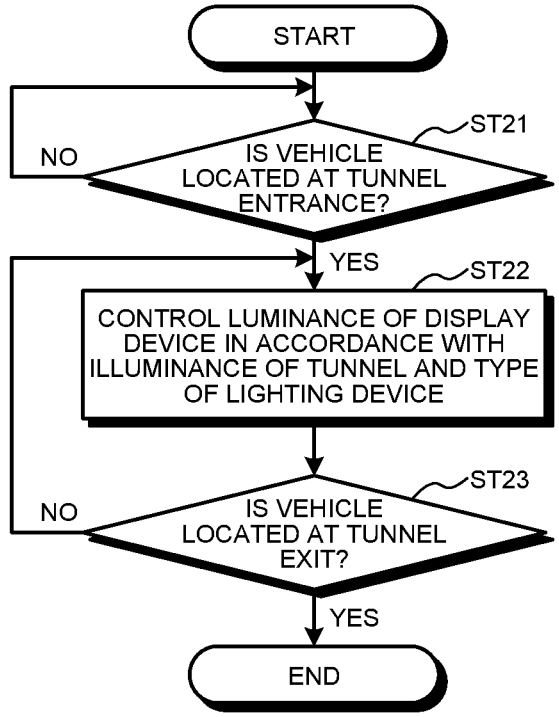
FIG. 14 is a flowchart illustrating a flow of processes performed by a luminance control device according to a sixth embodiment.

An on-vehicle display device 10B according to a sixth embodiment will be described with reference to FIG. 14. FIG. 14 is a flowchart illustrating a flow of processes performed by a luminance control device according to the sixth embodiment. A basic configuration of the on-vehicle display device 10B is the same as the on-vehicle display device 10B of the fifth embodiment or the HUD device 10 of the second embodiment. In the following description, the same components as those of the on-vehicle display device 10B or the HUD device 10 of the second embodiment are denoted by the same or corresponding reference symbols, and detailed explanation thereof will be omitted. The on-vehicle display device 10B of the present embodiment refers to the same illuminance information database 200 as that of the second embodiment.

When the vehicle travels in the lighting device installed place, the display controller 33B controls luminance of a display video displayed on the display unit 20B in accordance with the illuminance at each of positions in the lighting device installed place and the light source type of the lighting device, based on the illuminance information referred to by the illuminance information referring unit 32 and the identification information acquired by the identification information acquiring unit 31. The display controller 33B performs the same process that the display controller 33 of the second embodiment performs for controlling the luminance of the display video projected by the projector 21, in order to control the luminance of the display video displayed on the display unit 20B.

A flow of processes performed by the luminance control device 30B will be described below with reference to FIG. 14. Processes at Step ST21 and Step ST23 are performed in the same manner as the processes at Step ST11, Step ST13 in the flowchart illustrated in FIG. 13.

When it is determined that the vehicle is located at the tunnel entrance (Yes at Step ST21), the luminance control device 30B controls the luminance in accordance with the illuminance of the tunnel and the light source type (Step ST22). More specifically, the luminance control device 30B causes the display controller 33B to generates a control signal for performing control so as to change the luminance of the display video displayed on the display unit 20B in accordance with the illuminance of the current location of the vehicle and the light source type, based on the current location information on the vehicle, the acquired illuminance pattern, and the acquired light source type. The luminance control device 30B causes the display controller 33B to output the control signal for controlling the luminance of the display video displayed on the display unit 20B to the display unit 20B. The luminance control device 30B proceeds to Step ST23.

As described above, in the present embodiment, when the vehicle travels in the lighting device installed place, by changing the luminance of the display video displayed on the display unit 20B in accordance with a change of the illuminance around the vehicle and the light source type, it is possible to suppress deterioration of the visibility of the on-vehicle display device 10B. In other words, according to the present embodiment, when the vehicle travels in the lighting device installed place, it is possible to maintain high visibility of the on-vehicle display device 10B independently of a change of the illuminance around the vehicle and the light source type.

Seventh Embodiment

Figure 15:
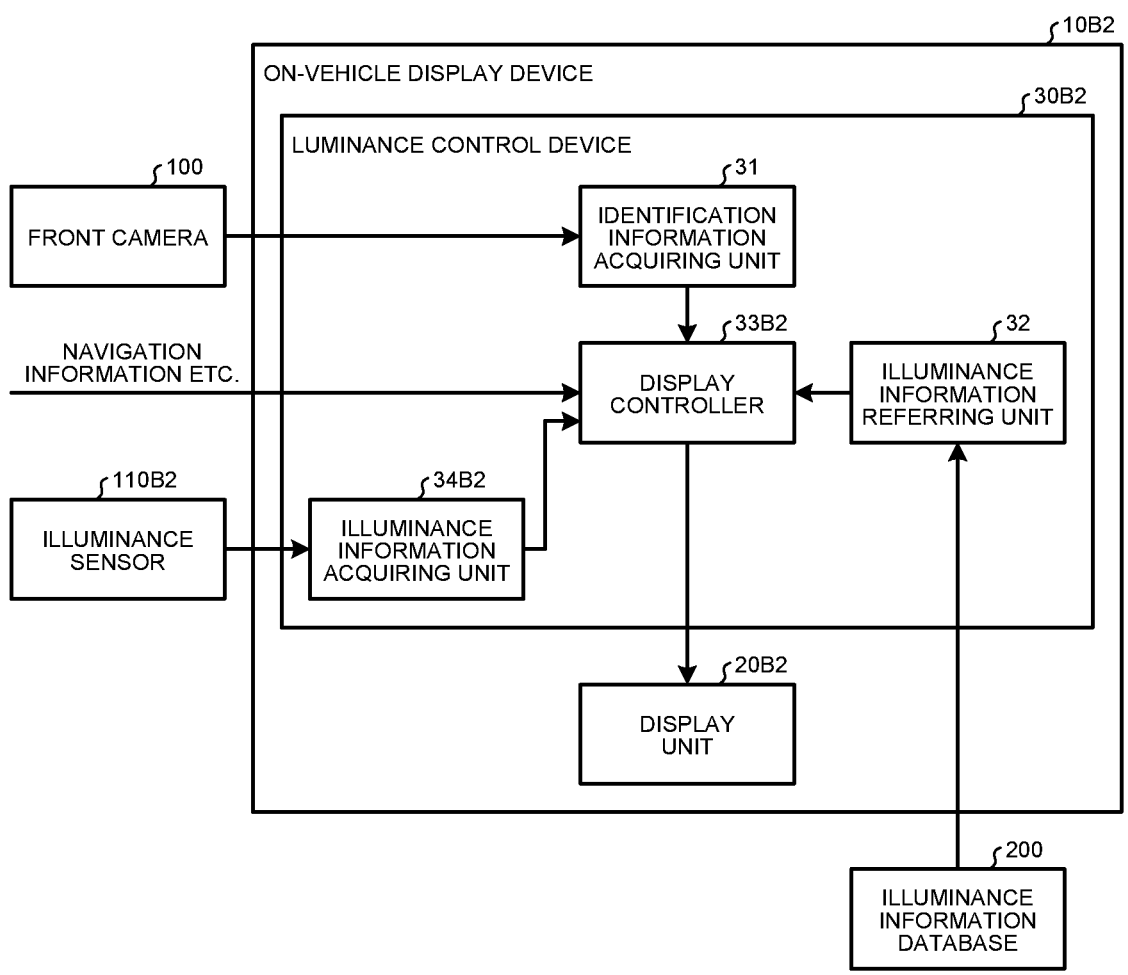
FIG. 15 is a block diagram illustrating a configuration example of a luminance control device according to a seventh embodiment.
Figure 16:
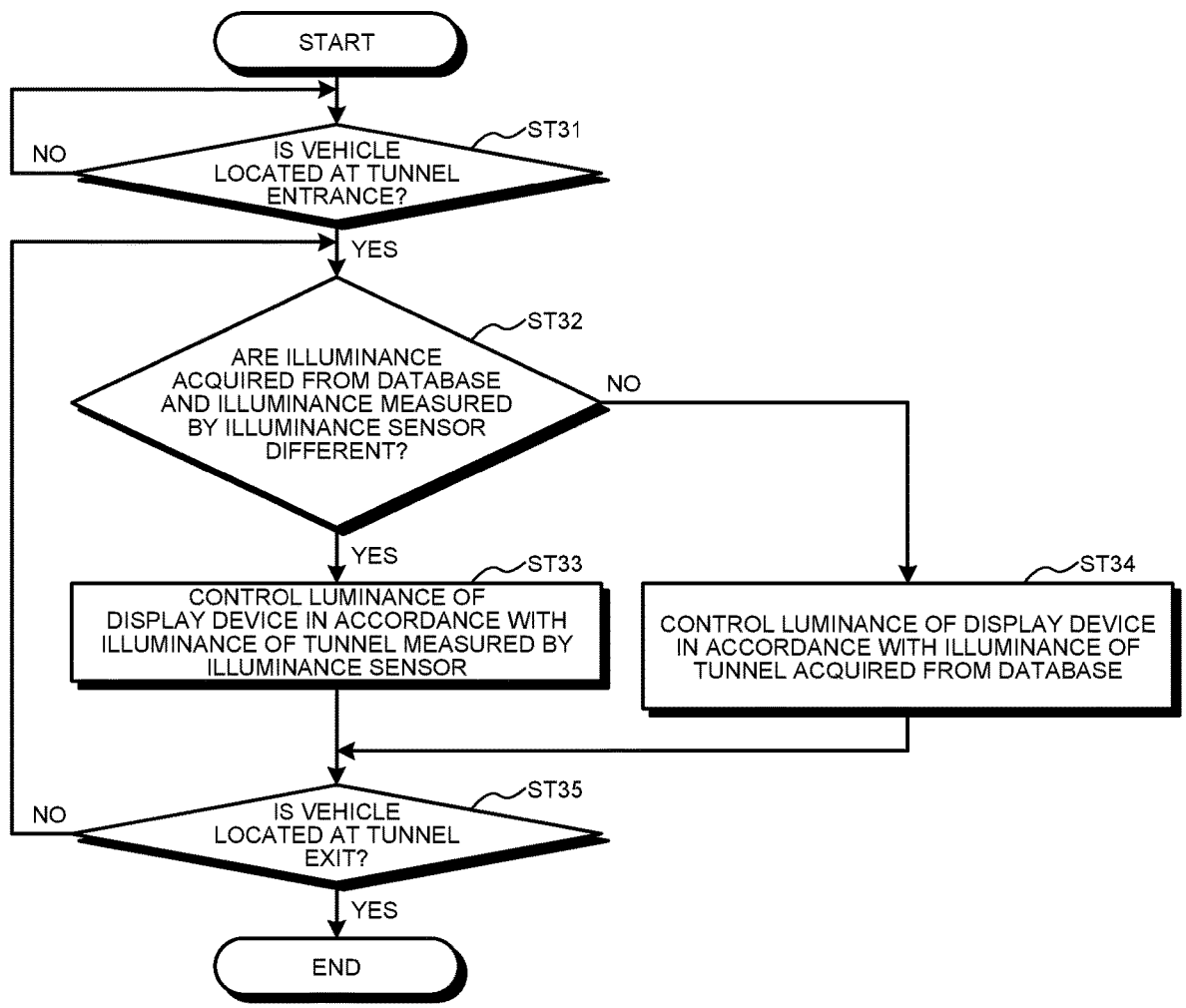
FIG. 16 is a flowchart illustrating a flow of processes performed by the luminance control device according to the seventh embodiment.

An on-vehicle display device 10B2 according to a seventh embodiment will be described with reference to FIG. 15 and FIG. 16. FIG. 15 is a block diagram illustrating a configuration example of a luminance control device according to the seventh embodiment. FIG. 16 is a flowchart illustrating a flow of processes performed by the luminance control device according to the seventh embodiment. A basic configuration of the on-vehicle display device 10B2 is the same as the on-vehicle display device 10B of the fifth embodiment or the HUD device 10A of the third embodiment. In the following description, the same components as those of the on-vehicle display device 10B or the HUD device 10A of the third embodiment are denoted by the same or corresponding reference symbols, and detailed explanation thereof will be omitted. The on-vehicle display device 10B2 includes an illuminance sensor 110B2 that is the same as the illuminance sensor 110A of the third embodiment.

The on-vehicle display device 10B2 is different from the fifth embodiment in that a luminance control device 30B2 includes an illuminance information acquiring unit 34B2 and a display controller 33B2 performs a different process. The illuminance information acquiring unit 34B2 is configured in the same manner as the illuminance information acquiring unit 34A of the third embodiment.

At a position at which the illuminance of the illuminance information acquired from the referred illuminance information database 200 and the illuminance of the measurement result of the illuminance sensor 110B2 are different, the display controller 33B2 performs control so as to change the luminance of the display video displayed on the display unit 20B in accordance with the illuminance of the measurement result, based on the illuminance information referred to by the illuminance information referring unit 32, the identification information acquired by the identification information acquiring unit 31, and the measurement result obtained by the illuminance information acquiring unit 34B2.

A flow of processes performed by the luminance control device 30B2 will be described with reference to FIG. 16. Processes at Step ST31, Step ST34, and Step ST35 are performed in the same manner as the processes at Step ST11, Step ST12, and Step ST13 in the flowchart illustrated in FIG. 13. A process at Step ST32 is performed in the same manner as the process at Step S32 in the flowchart illustrated in FIG. 8.

At a position at which it is determined as Yes at Step ST32, the luminance control device 30B2 controls the luminance in accordance with the illuminance measured by the illuminance sensor 110B2 (Step ST33). More specifically, the luminance control device 30B2 causes the display controller 33B2 to generate a control signal for controlling the luminance of the backlight such that the luminance of the instrument panel video displayed on the display unit 20B is changed in accordance with the illuminance of the measurement result acquired by the illuminance information acquiring unit 34B2. The luminance control device 30B2 causes the display controller 33B2 to output the control signal for controlling the luminance of the backlight to the display unit 20B. The luminance control device 30B2 proceeds to Step ST35.

In this manner, when the vehicle travels in the tunnel, the luminance is changed in accordance with the illuminance measured by the illuminance sensor 110B2 at a position at which the illuminance acquired from the referred illuminance information database 200 and the illuminance measured by the illuminance sensor 110B2 are different. For example, in the section under the lighting device A that is not turned on as illustrated in FIG. 9, the luminance is controlled in accordance with the illuminance measured by the illuminance sensor 110B2. Thus, even at a position at which actual illuminance is different from the illuminance in the illuminance information database 200, the luminance of the display video displayed on the display unit 20B is appropriately changed in accordance with the illuminance measured by the illuminance sensor 110B2.

As described above, in the present embodiment, at a position at which the illuminance in the referred illuminance information database 200 and the illuminance measured by the illuminance sensor 110B2 are different, the luminance of the display video displayed on the display unit 20B is changed in accordance with the illuminance measured by the illuminance sensor 110B2. In the present embodiment, for example, in the section under the lighting device A that is not turned on as illustrated in FIG. 9, the luminance is controlled in accordance with the illuminance measured by the illuminance sensor 110B2. Therefore, in the present embodiment, even at a position at which the lighting device is not turned on, it is possible to change the luminance of the display video displayed on the display unit 20B in accordance with accurate illuminance in the lighting device installed place. In this manner, in the present embodiment, it is possible to more appropriately suppress deterioration of the visibility of the on-vehicle display device 10B due to a change of the illuminance around the vehicle.

In contrast, when the luminance is changed in accordance with the illuminance in the illuminance information database 200 in the section under the lighting device A that is not turned on as illustrated in FIG. 9, a display video with increased luminance is displayed even though the the vehicle is in dark surroundings because the lighting device A is not turned on. In this case, the display video may appear in the windshield S and it may become difficult to view the front of the vehicle through the windshield S.

Eighth Embodiment

Figure 17:
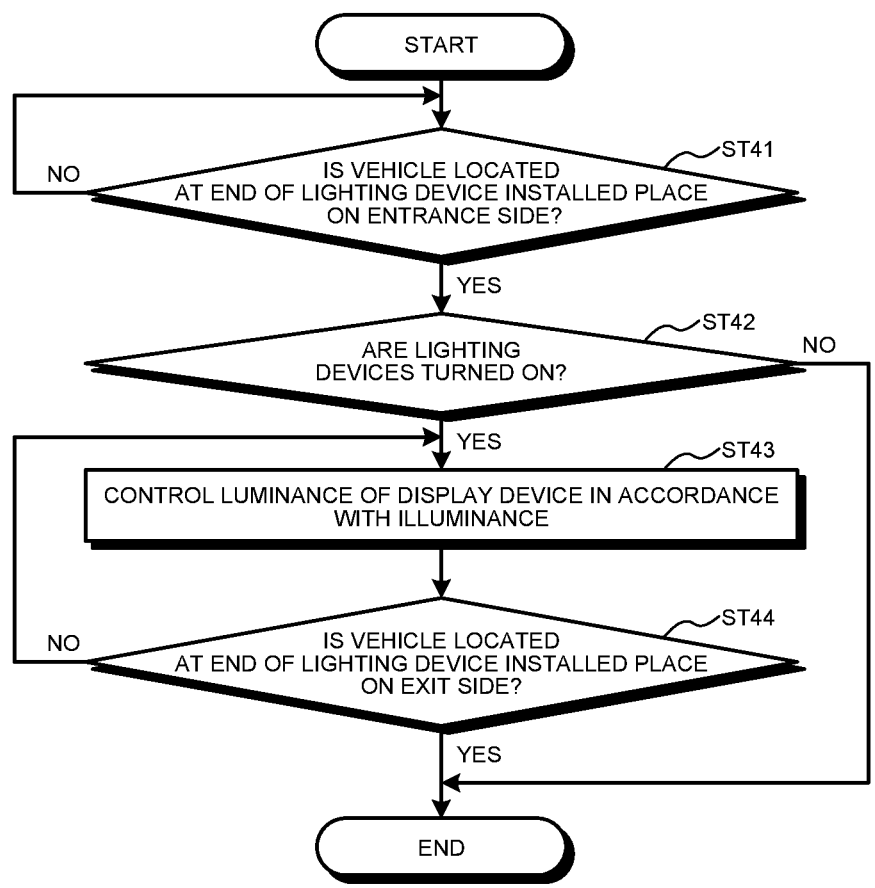
FIG. 17 is a flowchart illustrating a flow of processes performed by a luminance control device according to an eighth embodiment.

An on-vehicle display device 10B according to an eighth embodiment will be described with reference to FIG. 17. FIG. 17 is a flowchart illustrating a flow of processes performed by a luminance control device according to the eighth embodiment. A basic configuration of the on-vehicle display device 10B is the same as the on-vehicle display device 10B of the fifth embodiment or the HUD device 10 of the fourth embodiment. In the following description, the same components as those of the on-vehicle display device 10B or the HUD device 10 of the fourth embodiment are denoted by the same or corresponding reference symbols, and detailed explanation thereof will be omitted. The on-vehicle display device 10B is different from the fifth embodiment mainly in that the display controller 33B performs a different process. The on-vehicle display device 10B of the present embodiment refers to the same illuminance information database 200 as that of the fourth embodiment.

When the vehicle travels in the lighting device installed place, and when the lighting devices are turned on, the display controller 33B performs control so as to change the luminance of the display video displayed on the display unit 20B in accordance with the illuminance pattern of the lighting device installed place.

A flow of processes performed by the luminance control device 30B will be described below with reference to FIG. 17. Processes at Step ST41, Step ST43, and Step ST44 are performed in the corresponding manner as the processes at Step ST11, Step ST12, Step ST13 in the flowchart illustrated in FIG. 5.

The luminance control device 30B determines whether the lighting devices are turned on (Step ST42). When the lighting condition of the lighting devices is satisfied (Yes at Step ST42), the luminance control device 30B proceeds to Step ST43. When the lighting condition of the lighting devices is not satisfied (No at Step ST42), the luminance control device 30B terminates the process.

As described above, in the present embodiment, even when the lighting device installed place is a place in which the lighting devices are turned on only at night or in dark surroundings, it is possible to appropriately suppress deterioration of the visibility of the on-vehicle display device 10B.

Ninth Embodiment

Figure 18:
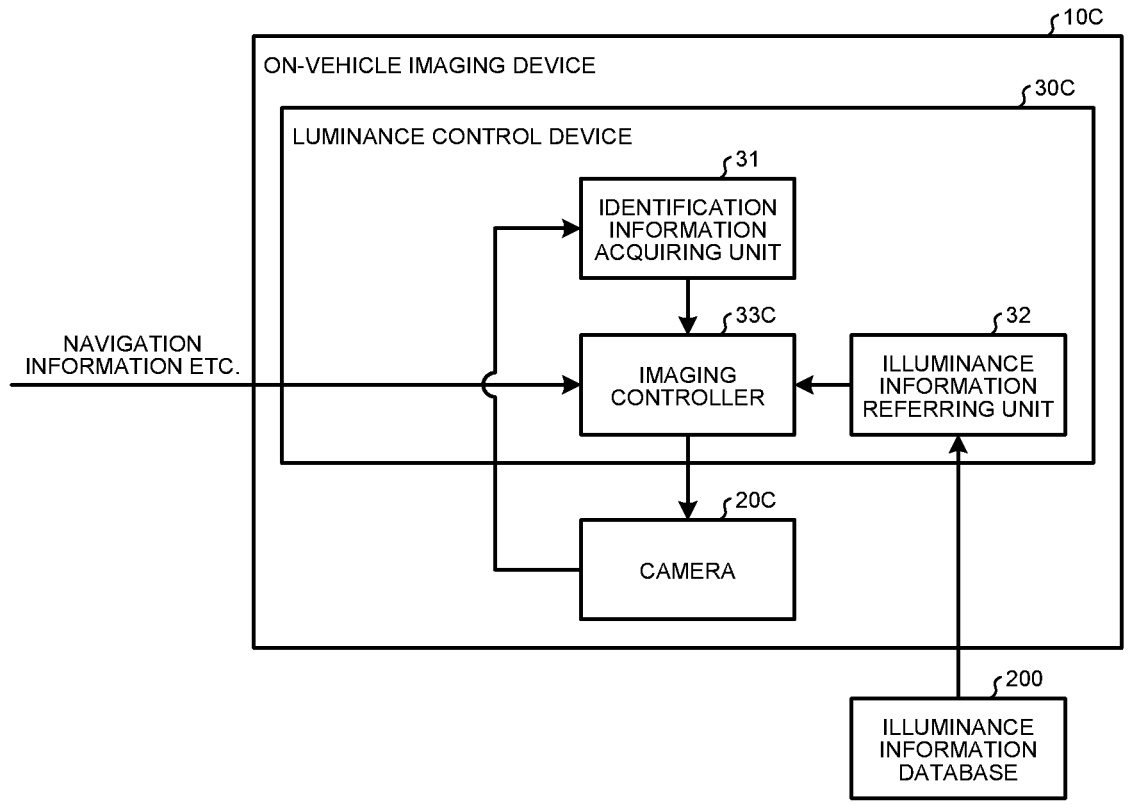
FIG. 18 is a block diagram illustrating a configuration example of an imaging control device according to a ninth embodiment.
Figure 19:
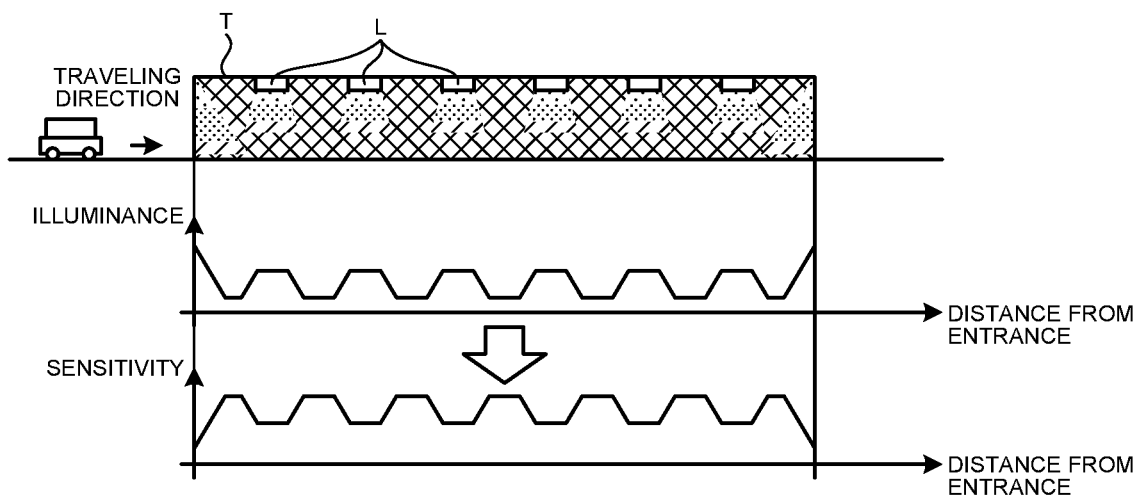
FIG. 19 is a diagram illustrating an example of sensitivity control based on an illuminance pattern of a tunnel.
Figure 20:
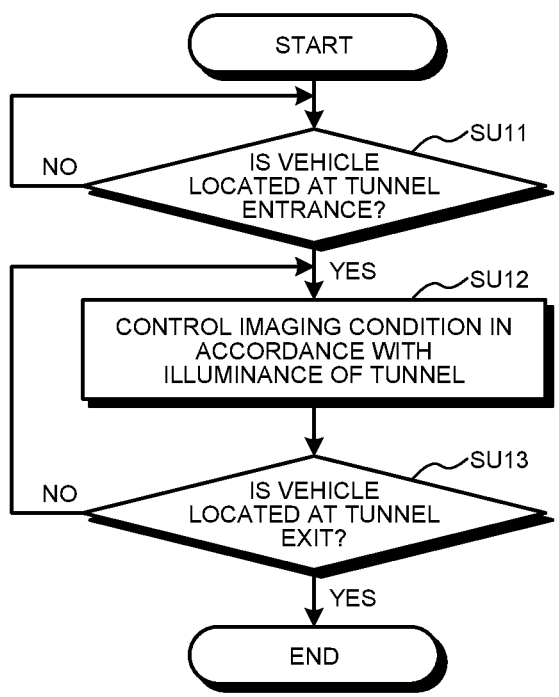
FIG. 20 is a flowchart illustrating a flow of processes performed by the imaging control device according to the ninth embodiment.

An on-vehicle imaging device 10C according to a ninth embodiment will be described with reference to FIG. 18 to FIG. 20. FIG. 18 is a block diagram illustrating a configuration example of an imaging control device according to the ninth embodiment. FIG. 19 is a diagram illustrating an example of sensitivity control based on an illuminance pattern of a tunnel. FIG. 20 is a flowchart illustrating a flow of processes performed by the imaging control device according to the ninth embodiment. An imaging control device 30C controls an imaging condition of a video of surroundings of a vehicle that is captured by the on-vehicle imaging device 10C. More specifically, when the vehicle travels in a lighting device installed place, such as a tunnel, the imaging control device 30C performs control so as to change the imaging condition of a video of surroundings of the vehicle that is captured by the on-vehicle imaging device 10C, in accordance with a change of the illuminance in the lighting device installed place.

Illuminance in the tunnel T will be described with reference to FIG. 19. Sensitivity is reduced in sections with high illuminance in the tunnel T, and the sensitivity is increased in sections with low illuminance in the tunnel T.

The on-vehicle imaging device 10C captures a video of surroundings of the vehicle. When the vehicle travels in the lighting device installed place, the on-vehicle imaging device 10C performs control so as to change the imaging condition in accordance with a change of the illuminance in the lighting device installed place. The on-vehicle imaging device 10C includes a camera (imager) 20C and an imaging control device 30C.

The camera 20C is a front video camera. The camera 20C is arranged on the front of the vehicle and captures a video of surroundings around the front of the vehicle. The camera 20C outputs captured front video data to the identification information acquiring unit 31 of the imaging control device 30C. The imaging condition of the camera 20C is controlled based on a control signal obtained from an imaging controller 33C of the imaging control device 30C. The front video data is, for example, a moving image formed of images of 30 frames per second.

The imaging condition includes at least one of an aperture value, a shutter speed, and sensitivity.

When the vehicle travels in the lighting device installed place, the imaging control device 30C controls the imaging condition of the camera 20C in accordance with a change of the illuminance in the lighting device installed place. The imaging control device 30C is, for example, an arithmetic processing device including a CPU or the like. The imaging control device 30C loads a program stored in a storage (not illustrated) onto a memory and executes commands included in the program. The imaging control device 30C includes the identification information acquiring unit 31, the illuminance information referring unit 32, and the imaging controller 33C. The imaging control device 30C includes an internal memory (not illustrated), and the internal memory is used for, for example, temporarily storing data in the imaging control device 30C. The identification information acquiring unit 31 has the same configuration as the identification information acquiring unit 31 of the first embodiment. The illuminance information referring unit 32 has the same configuration as the illuminance information referring unit 32 of the first embodiment.

In the present embodiment, the identification information acquiring unit 31 is a character recognition unit and recognizes characters that are included as a captured object in the front video data captured by the camera 20C.

The imaging controller 33C controls the imaging condition of the camera 20C.

When the vehicle travels in the lighting device installed place, the imaging controller 33C performs control so as to change the imaging condition of the camera 20C in accordance with the illuminance pattern of the lighting device installed place. More specifically, when the vehicle travels in the lighting device installed place, the imaging controller 33C acquires an illuminance pattern of the lighting device installed place in which the vehicle travels, based on the identification information acquired by the identification information acquiring unit 31 and the illuminance information referred to by the illuminance information referring unit 32. When a plurality of lighting device installed places with identical names exist, the imaging controller 33C acquires the illuminance pattern of the lighting device installed place in which the vehicle travels, based on current location information on the vehicle acquired from the navigation system and positional information on the tunnel stored in the illuminance information database 200. Then, the imaging controller 33C performs control so as to change the imaging condition of the camera 20C in accordance with the illuminance of the current location of the vehicle, based on the acquired current location information on the vehicle and the illuminance pattern of the lighting device installed place.

For example, the imaging controller 33C adjusts brightness of a video to be captured to appropriate brightness by changing only the aperture value as the imaging condition. More specifically, when the vehicle travels in the lighting device installed place, the imaging controller 33C may generate a control signal for controlling the aperture value of the camera 20C in accordance with the illuminance pattern of the lighting device installed place. At the high illuminance position, the imaging controller 33C outputs a control signal for increasing the aperture value as compared to the low illuminance position. At the low illuminance position, the imaging controller 33C outputs a control signal for reducing the aperture value as compared to the high illuminance position. By setting an appropriate aperture value in accordance with the illuminance, luminance of each of pixels of the video to be captured is changed.

Alternatively, for example, the imaging controller 33C may adjust the brightness of the video to be captured to appropriate brightness by changing only the sensitivity as the imaging condition. More specifically, when the vehicle travels in the lighting device installed place, the imaging controller 33C may generate a control signal for controlling the sensitivity of the camera 20C in accordance with the illuminance pattern of the lighting device installed place. At the high illuminance position, the imaging controller 33C outputs a control signal for reducing the sensitivity as compared to the low illuminance position. At the low illuminance position, the imaging controller 33C outputs a control signal for increasing the sensitivity as compared to the high illuminance position. By setting appropriate sensitivity in accordance with the illuminance, the luminance of each of the pixels of the video to be captured is changed.

Still alternatively, for example, the imaging controller 33C may adjust the brightness of the video to be captured to appropriate brightness by changing each of the aperture value, the shutter speed, and the sensitivity as the imaging condition. More specifically, when the vehicle travels in the lighting device installed place, the imaging controller 33C may generate a control signal for controlling the shutter speed of the camera 20C in accordance with the illuminance pattern of the lighting device installed place. At the high illuminance position, the imaging controller 33C outputs a control signal for reducing the aperture value as compared to the low illuminance position, increasing the shutter speed as compared to the low illuminance position, and reducing the sensitivity as compared to the low illuminance position. At the low illuminance position, the imaging controller 33C outputs a control signal for increasing the aperture value as compared to the high illuminance position, decreasing the shutter speed as compared to the high illuminance position, and increasing the sensitivity as compared to the high illuminance position. In this manner, by setting a combination of the aperture value, the shutter speed, and the sensitivity that are appropriate for the illuminance, the luminance of each of the pixels of the video to be captured is changed.

As described above, when the vehicle travels in the lighting device installed place, the imaging controller 33C performs control so as to change the imaging condition of the camera 20C in accordance with the illuminance pattern of the lighting device installed place.

In the present embodiment, when the vehicle travels in the tunnel, the imaging controller 33C causes the camera 20C to capture a video by changing the sensitivity in accordance with the illuminance of the tunnel. More specifically, when the vehicle travels in the tunnel, the imaging controller 33C generates a control signal for performing control so as to change the sensitivity of the camera 20C in accordance with the illuminance pattern of the tunnel. For example, at the entrance and the exit of the tunnel, the imaging controller 33C generates a control signal for minimizing the sensitivity in the tunnel. For example, in the section under the lighting device in the middle section of the tunnel, the imaging controller 33C generates a control signal for increasing the sensitivity as compared to that at the entrance and the exit of the tunnel. For example, at a position distant from the section under the lighting device in the middle section of the tunnel, the imaging controller 33C generates a control signal for increasing the sensitivity as compared to that in the section under the lighting device.

A flow of processes performed by the imaging control device 30C will be described with reference to FIG. 20. In the present embodiment, a case will be described in which when the vehicle travels in the tunnel, the sensitivity as the imaging condition is changed in accordance with the illuminance pattern of the tunnel. Step SU11 is performed in the same manner as the process at Step S11 in the flowchart illustrated in FIG. 5.

While the on-vehicle imaging device 10C is activated, the camera 20C captures a video of the front of the vehicle. While the on-vehicle imaging device 10C is activated, the identification information acquiring unit 31 acquires front video data captured by the camera 20C.

When it is determined that the vehicle is not located at a tunnel entrance (No at Step SU11), the imaging control device 30C causes the camera 20C to capture videos without changing the imaging condition.

When it is determined that the vehicle is located at the tunnel entrance (Yes at Step SU11), the imaging control device 30C controls the imaging condition in accordance with the illuminance of the tunnel (Step SU12). More specifically, the imaging control device 30C causes the imaging controller 33C to acquire an illuminance pattern of the tunnel in which the vehicle travels, based on the identification information acquired by the identification information acquiring unit 31 and the illuminance information referred to by the illuminance information referring unit 32. Then, the imaging control device 30C causes the imaging controller 33C to generate a control signal for controlling the sensitivity such that the imaging condition of the camera 20C is changed in accordance with the illuminance of the current location of the vehicle, based on the current location information on the vehicle acquired from the navigation system and the acquired illuminance pattern. The imaging control device 30C causes the imaging controller 33C to output the control signal for controlling the imaging condition to the camera 20C. The imaging control device 30C proceeds to Step SU13.

The imaging control device 30C determines whether the vehicle is located at a tunnel exit (Step SU13). When the current location of the vehicle is the tunnel exit (Yes at Step SU13), the imaging control device 30C terminates the process and terminates control of changing the imaging condition in accordance with the illuminance pattern of the tunnel. When the current location of the vehicle is not the tunnel exit (No at Step SU13), the imaging control device 30C performs the process at Step SU12 again.

In this manner, when the vehicle travels in the tunnel, the imaging condition of the camera 20C is changed in accordance with the illuminance of the tunnel. For example, at the tunnel entrance, the sensitivity of the camera 20C is minimized in the tunnel. For example, in the section under the lighting device in the middle section of the tunnel, the sensitivity of the camera 20C is increased as compared to that at the tunnel entrance. For example, at a position distant from the section under the lighting device in the middle section of the tunnel, the sensitivity of the camera 20C is increased as compared to that in the section under the lighting device.

As described above, in the present embodiment, when the vehicle travels in the lighting device installed place, the imaging condition of the camera 20C is changed in accordance with the illuminance pattern of the lighting device installed place. More specifically, in the present embodiment, when the vehicle travels in the lighting device installed place, an imaging condition is set so that an appropriate video can be captured even when the illuminance is changed. In this manner, in the present embodiment, when the vehicle travels in the lighting device installed place, by changing the imaging condition in accordance with a change of the illuminance around the vehicle, it is possible to suppress deterioration of the visibility of a video captured by the on-vehicle imaging device 10C. In other words, according to the present embodiment, when the vehicle travels in the lighting device installed place, it is possible to maintain high visibility of the video captured by the on-vehicle imaging device 10C independently of a change of the illuminance around the vehicle.

When the imaging condition of the camera 20C is not changed when the vehicle travels in the lighting device installed place, for example, at the high illuminance position, a video in which blown-out highlights occur and a captured object is blurred may be captured. For example, at the low illuminance position, a video in which colors are darkened and a captured object is blurred may be captured.

In contrast, according to the present embodiment, when the vehicle travels in the lighting device installed place, the imaging condition is appropriately controlled in accordance with the illuminance, so that even when the illuminance around the vehicle is changed, it is possible to capture a video in which a captured object is clearly displayed.

According to the present embodiment, even in the vicinity of the tunnel exit, it is possible to appropriately control the imaging condition in accordance with an illuminance pattern of brightness perceived by human eyes. In this manner, according to the present embodiment, even in a place, such as in the vicinity of the tunnel exit, in which the illuminance rapidly changes, it is possible to control the imaging condition in accordance with the brightness perceived by human eyes. In the present embodiment, even in a place, such as in the vicinity of the tunnel exit, in which the illuminance rapidly changes, it is possible to suppress deterioration of the visibility of a video captured by the on-vehicle imaging device 10C.

Tenth Embodiment

An on-vehicle imaging device 10C according to a tenth embodiment will be described with reference to FIG. 21.

Figure 21:
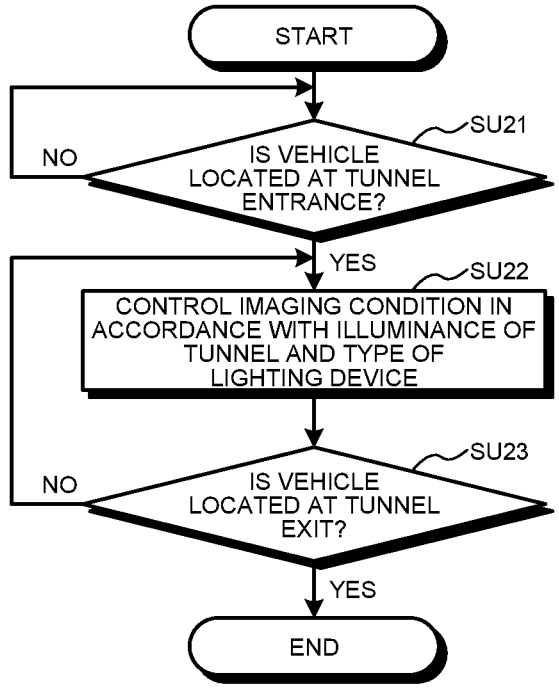
FIG. 21 is a flowchart illustrating a flow of processes performed by an imaging control device according to a tenth embodiment.

FIG. 21 is a flowchart illustrating a flow of processes performed by an imaging control device according to the tenth embodiment. A basic configuration of the on-vehicle imaging device 10C is the same as the on-vehicle imaging device 10C of the ninth embodiment. In the following description, the same components as those of the on-vehicle imaging device 10C will be denoted by the same or corresponding reference symbols, and detailed explanation thereof will be omitted. The same applies to other embodiments below. The on-vehicle imaging device 10C of the present embodiment refers to the same illuminance information database 200 as that of the second embodiment.

The imaging control device 30C changes the imaging condition of the camera 20C in accordance with the illuminance at each of positions in the lighting device installed place and the light source type of the lighting device.

The imaging condition includes at least one of an aperture value, a shutter speed, sensitivity, and white balance.

When the vehicle travels in the lighting device installed place, the imaging controller 33C performs control so as to change the imaging condition of the camera 20C in accordance with the illuminance at each of positions in the lighting device installed place and the light source type of the lighting devices, based on the illuminance information referred to by the illuminance information referring unit 32 and the identification information acquired by the identification information acquiring unit 31. More specifically, when the vehicle travels in the lighting device installed place, the imaging controller 33C controls the imaging condition of the camera 20C in accordance with the illuminance pattern of the lighting device installed place and the light source type.

When the vehicle travels in the lighting device installed place, the imaging controller 33C may generate a control signal for controlling the white balance as the imaging condition in accordance with the light source type of the lighting device installed place. For example, in a tunnel using sodium-vapor lamps, the imaging controller 33C outputs a control signal for gradually changing the white balance in accordance with a change of color temperature, because the color temperature changes from sunlight to sodium vapor light at the entrance and the exit.

For example, when the light source type is the sodium-vapor lamp, the imaging controller 33C controls the imaging condition of the camera 20C such that visibility of a captured video is not deteriorated even under orange illumination light. For example, when the light source type is the white LED, the imaging controller 33C controls the imaging condition of the camera 20C such that visibility of a captured video is not deteriorated even under illumination light of the white LED.

A flow of processes performed by the imaging control device 30C will be described with reference to FIG. 21. Processes at Step SU21 and Step SU23 are performed in the same manner as the processes at Step SU11 and Step SU13 in the flowchart illustrated in FIG. 20. In the present embodiment, a case will be described in which when the vehicle travels in the tunnel, the sensitivity as the imaging condition is changed in accordance with the illuminance pattern of the tunnel and the light source type of the lighting devices.

When it is determined that the vehicle is located at the tunnel entrance (Yes at Step SU21), the imaging control device 30C controls the imaging condition in accordance with the illuminance of the tunnel and the light source type (Step SU22). More specifically, the imaging control device 30C causes the imaging controller 33C to generate a control signal for controlling the sensitivity such that the imaging condition of the camera 20C is changed in accordance with the current location of the vehicle and the light source type, based on the current location information on the vehicle, the acquired illuminance pattern, and the acquired light source type. The imaging control device 30C causes the imaging controller 33C to outputs the control signal for controlling the imaging condition to the camera 20C. The imaging control device 30C proceeds to Step SU23.

As described above, in the present embodiment, when the vehicle travels in the lighting device installed place, by changing the imaging condition in accordance with a change of the illuminance around the vehicle and the light source type, it is possible to suppress deterioration of the visibility of a video captured by the on-vehicle imaging device 10C.

Eleventh Embodiment

Figure 22:
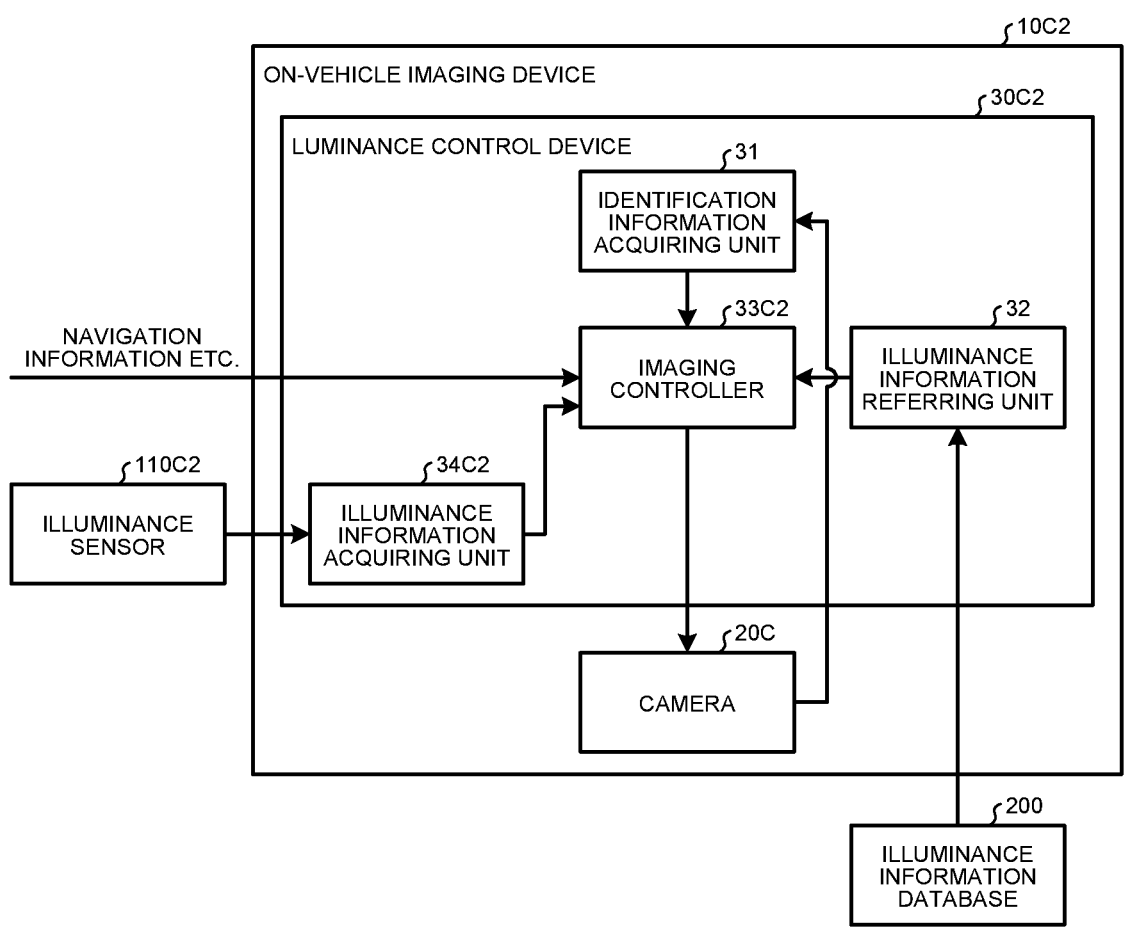
FIG. 22 is a block diagram illustrating a configuration example of an imaging control device according to an eleventh embodiment.
Figure 23:
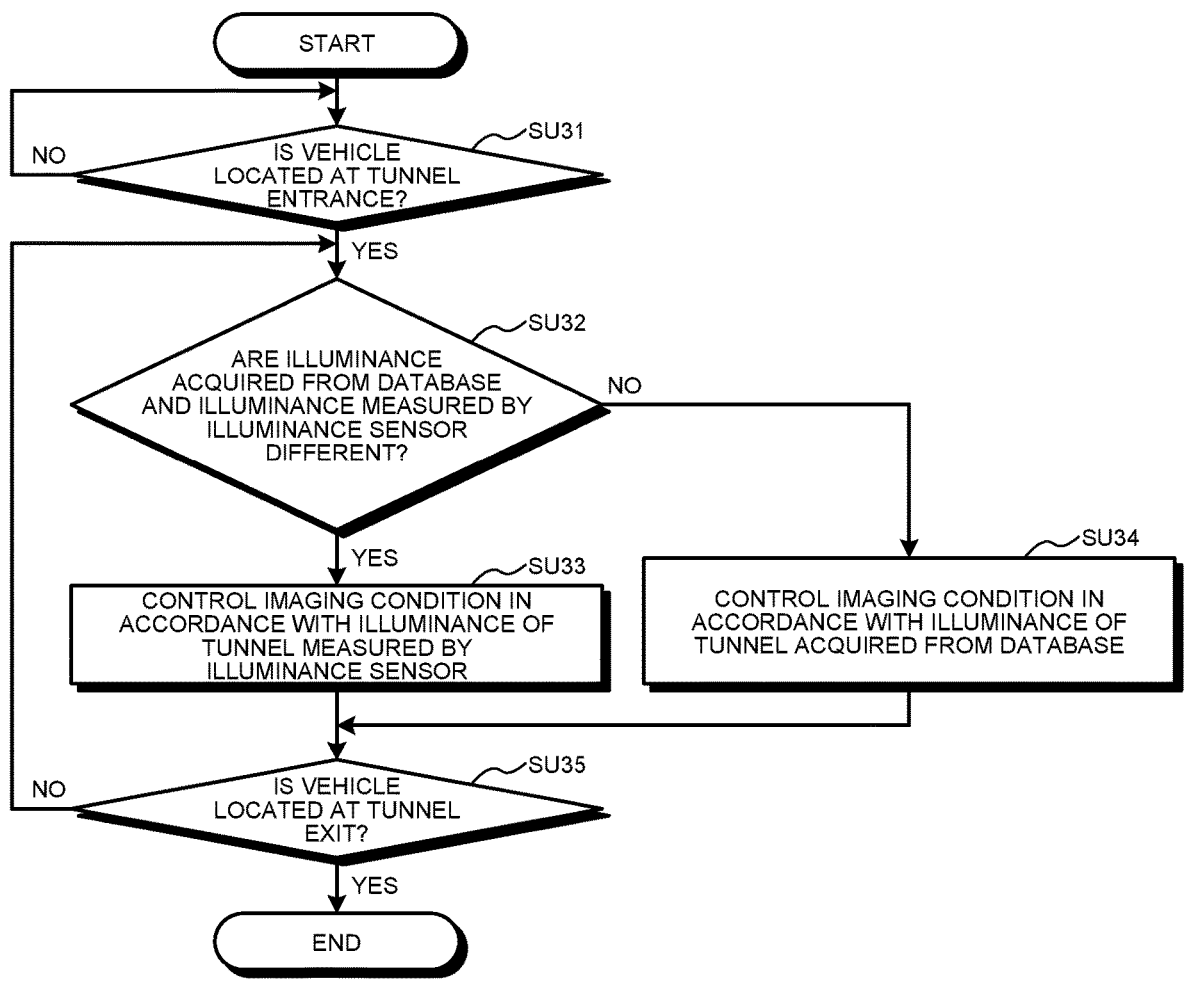
FIG. 23 is a flowchart illustrating a flow of processes performed by the imaging control device according to the eleventh embodiment.
Figure 24:
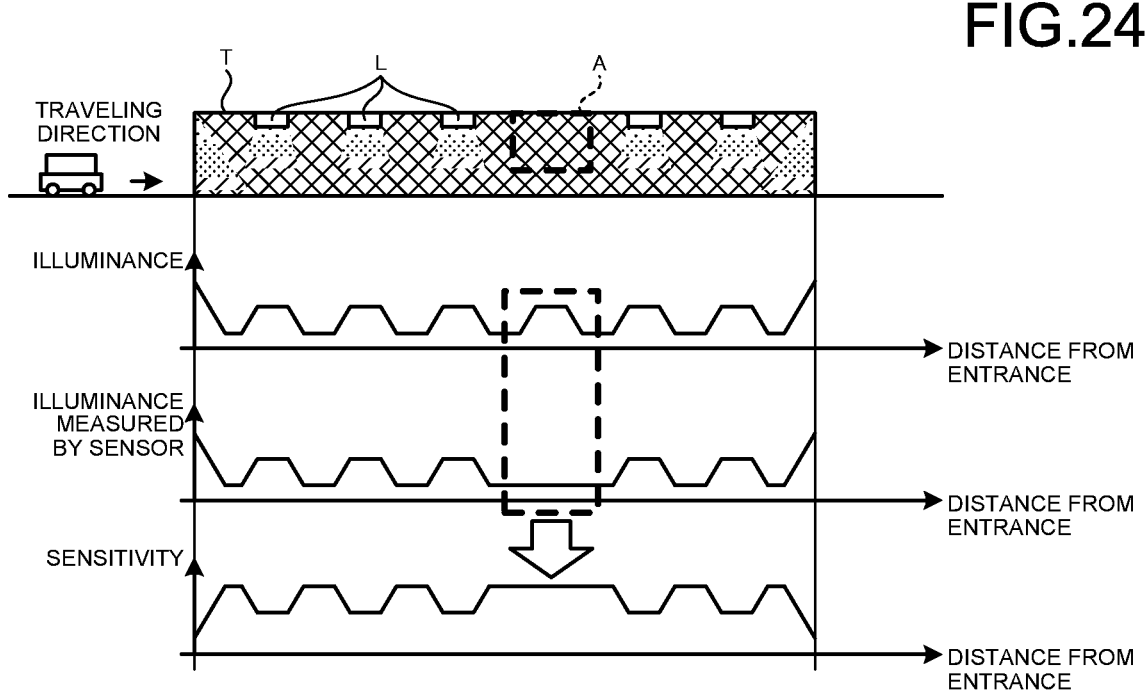
FIG. 24 is a diagram illustrating an example of sensitivity control based on illuminance of a tunnel detected by a sensor.

An on-vehicle imaging device 10C2 according to an eleventh embodiment will be described with reference to FIG. 22 to FIG. 24. FIG. 22 is a block diagram illustrating a configuration example of an imaging control device according to the eleventh embodiment. FIG. 23 is a flowchart illustrating a flow of processes performed by the imaging control device according to the eleventh embodiment. FIG. 24 is a diagram illustrating an example of sensitivity control based on the illuminance of the tunnel detected by the sensor. A basic configuration of the on-vehicle imaging device 10C2 is the same as the on-vehicle imaging device 10C of the ninth embodiment.

The on-vehicle imaging device 10C2 is different from the ninth embodiment in that an imaging control device 30C2 includes an illuminance information acquiring unit 34C2 and an imaging controller 33C2 performs a different process. The illuminance information acquiring unit 34C2 is configured in the same manner as the illuminance information acquiring unit 34A of the third embodiment. The on-vehicle imaging device 10C2 includes an illuminance sensor 110C2 that is the same as the illuminance sensor 110A of the third embodiment.

At a position at which the illuminance of the illuminance information acquired from the illuminance information database 200 and the illuminance of the measurement result of the illuminance sensor 110C2 are different, the imaging controller 33C2 performs control so as to change the imaging condition of the camera 20C in accordance with the illuminance of the measurement result, based on the illuminance information referred to by the illuminance information referring unit 32, the identification information acquired by the identification information acquiring unit 31, and the measurement result acquired by the illuminance information acquiring unit 34C2.

A flow of processes performed by the imaging control device 30C2 will be described with reference to FIG. 23. Processes at Step SU31, Step SU34, and Step SU35 are performed in the same manner as the processes at Step SU11, Step SU12, and Step SU13 in the flowchart illustrated in FIG. 20. In the present embodiment, a case will be described in which when the vehicle travels in the tunnel, the sensitivity as the imaging condition is changed in accordance with the illuminance of the measurement result at the position at which the illuminance of the illuminance information acquired from the referred illuminance information database 200 and the illuminance of the measurement result of the illuminance sensor 110C2 are different.

The imaging control device 30C2 determines whether the illuminance acquired from the illuminance information database 200 and the illuminance measured by the illuminance sensor 110C2 are different (Step SU32). More specifically, in the current location of the vehicle, when the illuminance of the illuminance information acquired from the illuminance information database 200 and the illuminance of the measurement result acquired by the illuminance information acquiring unit 34C2 are different (Yes at Step SU32), the imaging control device 30C2 proceeds to Step SU33. When the illuminance of the illuminance information acquired from the illuminance information database 200 and the illuminance of the measurement result acquired by the illuminance information acquiring unit 34C2 are not different (No at Step SU32), the imaging control device 30C2 proceeds to Step SU34.

At the position at which it is determined as Yes at Step SU32, the imaging control device 30C2 controls the imaging condition in accordance with the illuminance measured by the illuminance sensor 110C2 (Step SU33). More specifically, the imaging control device 30C2 causes the imaging controller 33C2 to generate a control signal for controlling the sensitivity of the camera 20C in accordance with the illuminance of the measurement result acquired by the illuminance information acquiring unit 34C2. The imaging control device 30C2 causes the imaging controller 33C2 to output the control signal for controlling the sensitivity to the camera 20C. The imaging control device 30C2 proceeds to Step SU35.

At the position at which it is determined as No at Step SU32, the imaging control device 30C2 controls the imaging condition in accordance with the illuminance of the illuminance information acquired from the illuminance information database 200 (Step SU34).

A case will be described with reference to FIG. 24, in which the illuminance acquired from the illuminance information database 200 and the illuminance measured by the illuminance sensor 110C2 are different. At a position under the lighting device A that is not turned on, the sensitivity is controlled in accordance with the illuminance measured by the illuminance sensor 110C2. At other positions, the sensitivity is controlled in accordance with the illuminance pattern acquired from the illuminance information database 200.

In this manner, when the vehicle travels in the tunnel, at the position at which the illuminance acquired from the illuminance information database 200 and the illuminance measured by the illuminance sensor 110C2 are different, the imaging condition is changed in accordance with the illuminance measured by the illuminance sensor 110C2. For example, in the section under the lighting device A that is not turned on as illustrated in FIG. 9, the imaging condition is controlled in accordance with the illuminance measured by the illuminance sensor 110C2. Thus, even at a position at which actual illuminance is different from the illuminance acquired from the illuminance information database 200, the imaging condition of the camera 20C is appropriately changed in accordance with the illuminance measured by the illuminance sensor 110C2.

As described above, in the present embodiment, at the position at which the illuminance acquired from the illuminance information database 200 and the illuminance measured by the illuminance sensor 110C2 are different, the imaging condition of the camera 20C is changed in accordance with the illuminance measured by the illuminance sensor 110C2. In the present embodiment, for example, in the section under the lighting device A that is not turned on as illustrated in FIG. 9, the imaging condition is controlled in accordance with the illuminance measured by the illuminance sensor 110C2. Therefore, in the present embodiment, even at the position at which the lighting device is not turned on, it is possible to change the imaging condition of the camera 20C in accordance with accurate illuminance of the lighting device installed place. In this manner, in the present embodiment, it is possible to appropriately suppress deterioration of the visibility of a video captured by the on-vehicle imaging device 10C due to a change of the illuminance around the vehicle.

In contrast, when the imaging condition is changed in accordance with the illuminance acquired from the illuminance information database 200 in the section under the lighting device A that is not turned on as illustrated in FIG. 9, a video which is dark and in which a captured object is blurred may be captured, even though the vehicle is in dark surroundings because the lighting device A is not turned on.

Twelfth Embodiment

Figure 25:
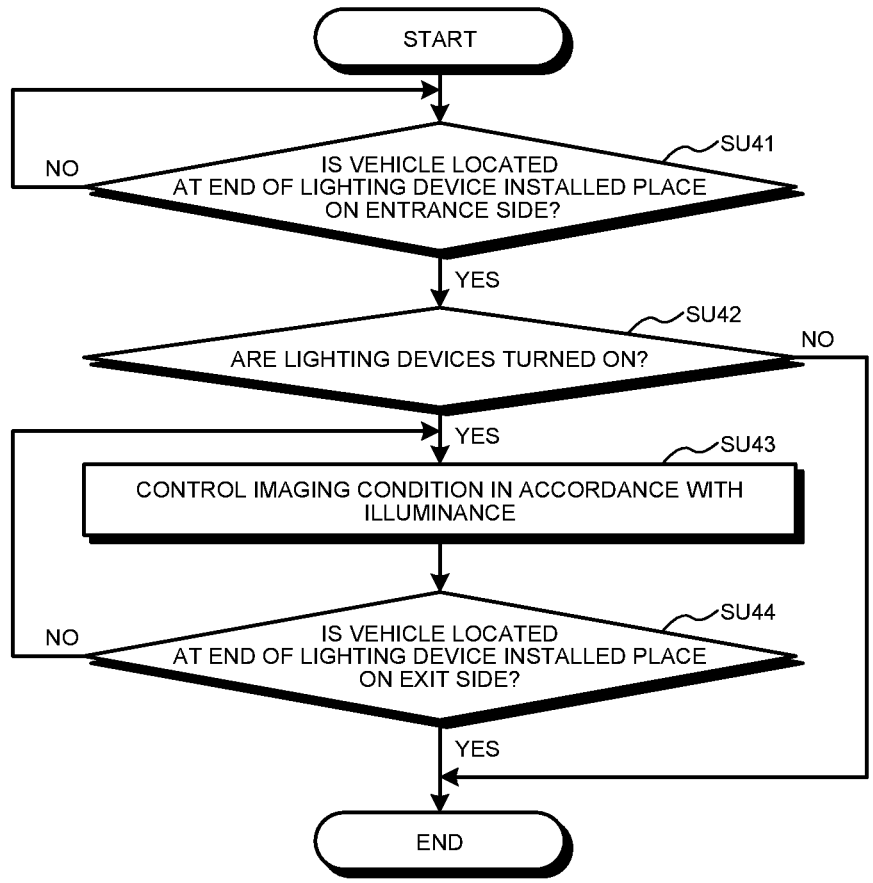
FIG. 25 is a flowchart illustrating a flow of processes performed by an imaging control device according to a twelfth embodiment.

An on-vehicle imaging device 10C according to a twelfth embodiment will be described with reference to FIG. 25. FIG. 25 is a flowchart illustrating a flow of processes performed by an imaging control device according to the twelfth embodiment. The on-vehicle imaging device 10C is different from the ninth embodiment mainly in that the imaging controller 33C performs a different process. The on-vehicle imaging device 10C of the present embodiment refers to the same illuminance information database 200 as that of the fourth embodiment.

When the vehicle travels in the lighting device installed place, and when the lighting devices are turned on, the imaging controller 33C changes the imaging condition of the camera 20C in accordance with the illuminance pattern of the lighting device installed place.

A flow of processes performed by the imaging control device 30C will be described with reference to FIG. 25. Processes at Step SU41, Step SU43, and Step SU44 are performed in the corresponding manner as the processes at Step SU11, Step SU12, and Step SU13 in the flowchart illustrated in FIG. 20. In the present embodiment, a case will be described in which when the vehicle travels in the lighting device installed place, and when the lighting devices are turned on, the imaging condition is controlled in accordance with the illuminance pattern of the lighting device installed place.

The imaging control device 30C determines whether the lighting devices are turned on (Step SU42). When the lighting condition of the lighting devices is satisfied (Yes at Step SU42), the imaging control device 30C proceeds to Step SU43. When the lighting condition of the lighting devices is not satisfied (No at Step SU42), the imaging control device 30C terminates the process.

As described above, in the present embodiment, even when the lighting device installed place is a place in which the lighting devices are turned on only at night or in dark surroundings, it is possible to appropriately suppress deterioration of the visibility of a video captured by the on-vehicle imaging device 10C.

Thirteenth Embodiment

Figure 26:
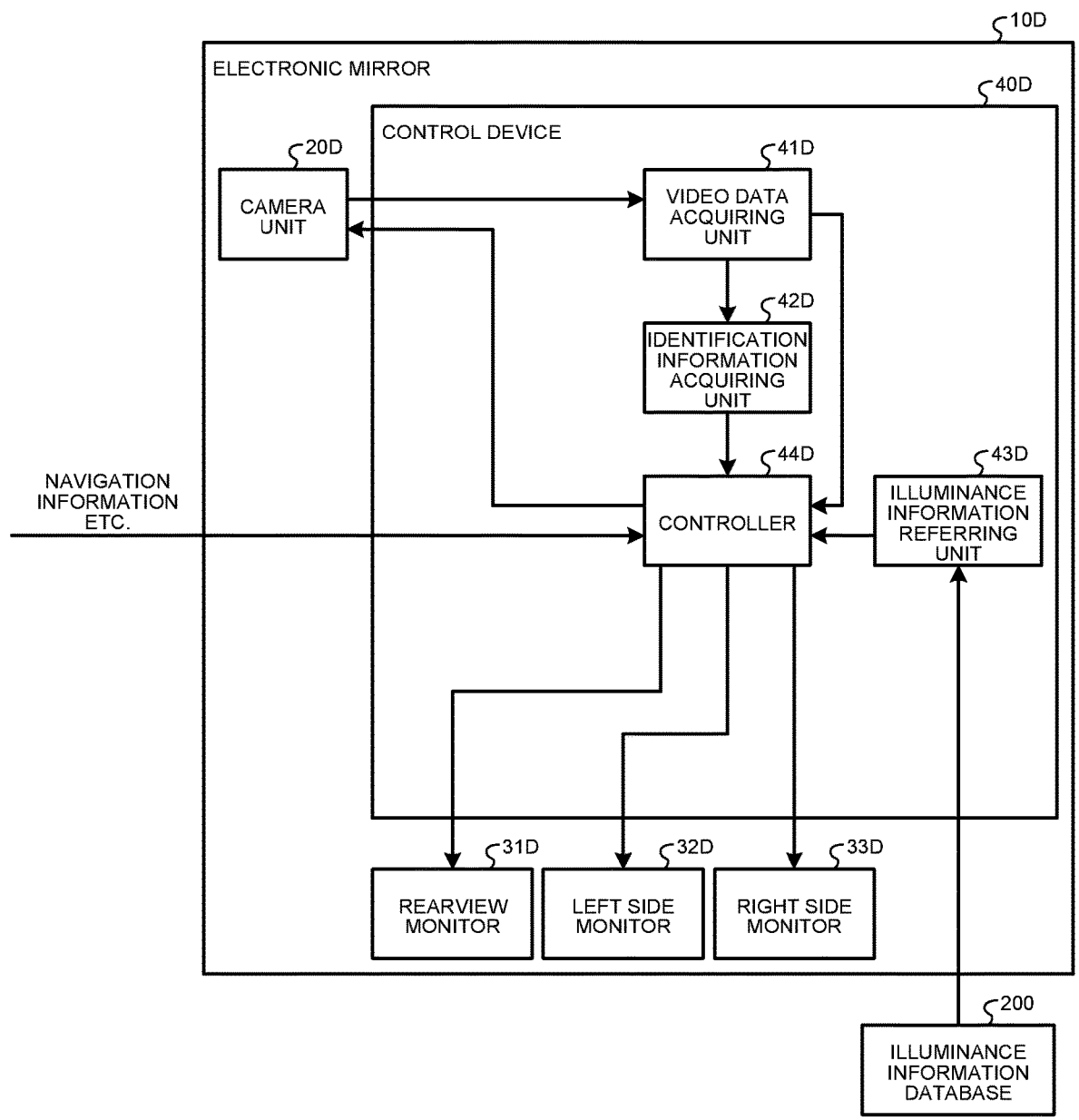
FIG. 26 is a block diagram illustrating a configuration example of an electronic mirror control device according to a thirteenth embodiment.
Figure 27:
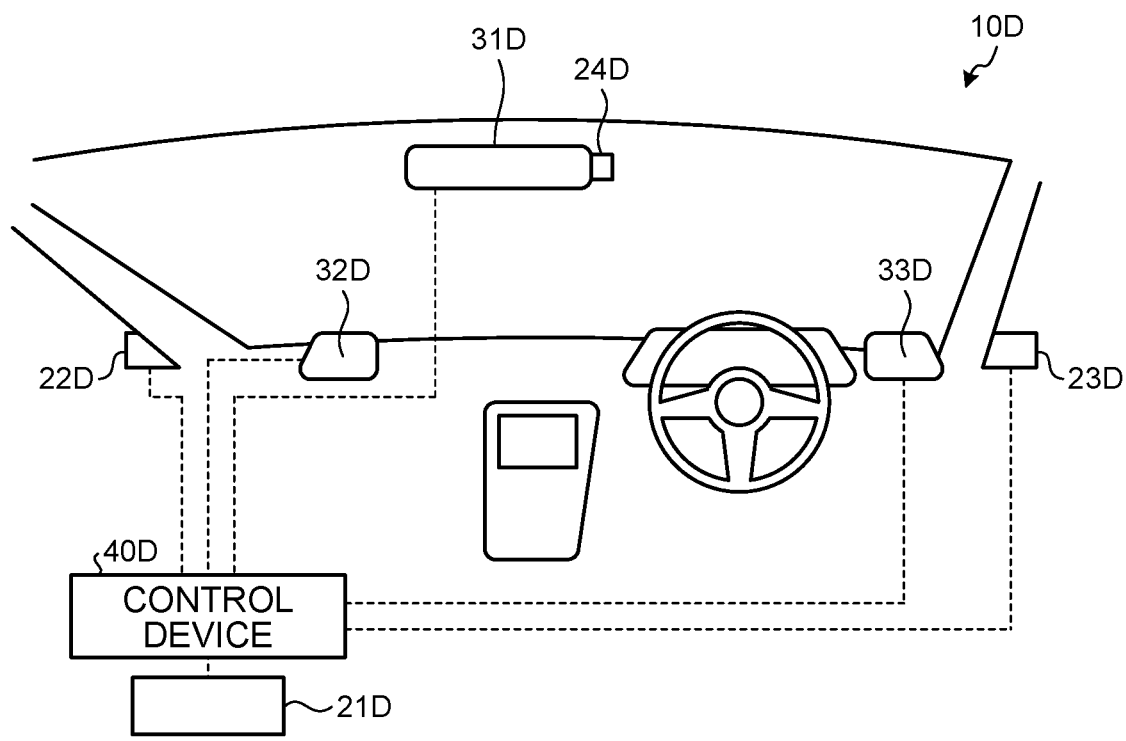
FIG. 27 is a schematic diagram illustrating a configuration example of the electronic mirror control device according to the thirteenth embodiment.
Figure 28:
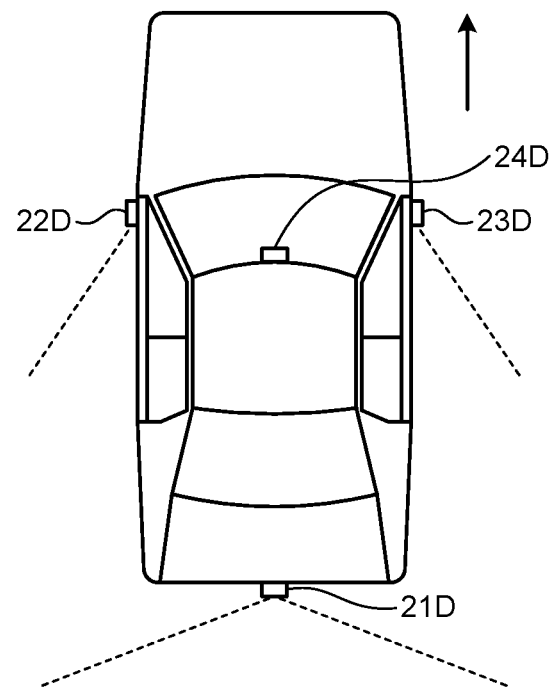
FIG. 28 is a schematic diagram illustrating a configuration example of the electronic mirror control device according to the thirteenth embodiment.

An electronic mirror 10D according to a thirteenth embodiment will be described with reference to FIG. 26 to FIG. 28. FIG. 26 is a block diagram illustrating a configuration example of an electronic mirror control device according to the thirteenth embodiment. FIG. 27 is a schematic diagram illustrating a configuration example of the electronic mirror control device according to the thirteenth embodiment. FIG. 28 is a schematic diagram illustrating a configuration example of the electronic mirror control device according to the thirteenth embodiment. The electronic mirror 10D displays a video for checking surroundings of a vehicle, in place of a conventional optical mirrors. The electronic mirror 10D is controlled by an electronic mirror control device (hereinafter, referred to as a "control device") 40D with reference to the illuminance information database 200 such that, for example, a video in which luminance is changed in accordance with illuminance at each of positions in a lighting device installed place, such as a tunnel, is displayed on an electronic mirror monitor.

The electronic mirror 10D includes a camera unit 20D, a rearview monitor (electronic mirror monitor) 31D, a left side monitor (electronic mirror monitor) 32D, a right side monitor (electronic mirror monitor) 33D, and the control device 40D.

The camera unit 20D will be described with reference to FIG. 27 and FIG. 28. The camera unit 20D includes a rear camera 21D, a left side camera 22D, a right side camera 23D, and a front camera 24D.

The rear camera 21D is arranged at a rear of the vehicle and captures a video of the rear of the vehicle. The rear camera 21D captures a video of a range including an area to be checked by the rearview monitor 31D. The rear camera 21D has a horizontal angle of view of, for example 90° to 180°, and a vertical angle of view of, for example, 45° to 90°. The rear camera 21D outputs captured video data to a video data acquiring unit 41D of the control device 40D.

The left side camera 22D is arranged on a left side of the vehicle and captures a video of the left side of the vehicle. The left side camera 22D captures a video of an area to be checked by the left side monitor 32D. The left side camera 22D has a horizontal angle of view of, for example, 15° to 45°, and a vertical angle of view of, for example, 15° to 45°. The angle of the left side camera 22D is freely adjustable. The left side camera 22D outputs the captured video to the video data acquiring unit 41D of the control device 40D.

The right side camera 23D is arranged on a right side of the vehicle and captures a video of the right side of the vehicle. The right side camera 23D captures a video of an area to be checked by the right side monitor 33D. The right side camera 23D has a horizontal angle of view of, for example, 15° to 45°, and a vertical angle of view of, for example, 15° to 45°. The angle of the right side camera 23D is freely adjustable. The right side camera 23D outputs the captured video to the video data acquiring unit 41D of the control device 40D.

The front camera 24D is a front video camera. The front camera 24D is arranged at the front of the vehicle and captures a video of surroundings of the front of the vehicle. The front camera 24D outputs captured front video data to the video data acquiring unit 41D of the control device 40D.

The rearview monitor 31D is, for example, an electronic rearview mirror. When the rearview monitor 31D is used as the electronic rearview mirror, it does not matter whether a half mirror for checking the rear side by optical reflection is provided. The rearview monitor 31D is, for example, a display including a liquid crystal display, an organic EL display, or the like. The rearview monitor 31D displays a rear video of the vehicle based on a video signal output from a controller 44D of the control device 40D. In the present embodiment, the rearview monitor 31D is arranged at an upper center of a windshield in a vehicle-width direction.

The right side monitor 33D is, for example, a display including a liquid crystal display, an organic EL display, or the like. The right side monitor 33D displays a right rear video of the vehicle based on a video signal output from the controller 44D of the control device 40D. In the present embodiment, the right side monitor 33D is arranged on a right side of a dashboard in the vehicle-width direction.

The left side monitor 32D is, for example, a display including a liquid crystal display, an organic EL display, or the like. The left side monitor 32D displays a left rear video of the vehicle based on a video signal output from the controller 44D of the control device 40D. In the present embodiment, the left side monitor 32D is arranged on a left side of the dashboard in the vehicle-width direction.

When the vehicle travels in the lighting device installed place, the control device 40D performs control such that videos in which luminance is changed in accordance with a change of the illuminance in the lighting device installed place are displayed on the rearview monitor 31D, the left side monitor 32D, and the right side monitor 33D that are the electronic mirror monitors. In the present embodiment, the control device 40D performs control so as to change the luminance of each of pixels of captured videos by changing the imaging condition of the camera unit 20D in accordance with the illuminance at each of positions in the lighting device installed place. The control device 40D is, for example, an arithmetic processing device including a CPU or the like. The control device 40D loads a program stored in a storage unit (not illustrated) onto a memory and executes commands included in the program. The control device 40D includes an identification information acquiring unit 42D, an illuminance information referring unit 43D, and the controller 44D. The control device 40D includes an internal memory (not illustrated), and the internal memory is used for temporarily storing data in the control device 40D.

The video data acquiring unit 41D acquires video data captured by the camera unit 20D. The video data acquired by the video data acquiring unit 41D is, for example, video data formed of consecutive images of 120 frames per second. The video data acquiring unit 41D outputs the acquired video data to the identification information acquiring unit 42D and the controller 44D.

The identification information acquiring unit 42D is configured in the same manner as the identification information acquiring unit 31 of the first embodiment.

The illuminance information referring unit 43D is configured in the same manner as the illuminance information referring unit 32 of the first embodiment.

The controller 44D causes the electronic mirror monitors to display videos for checking surroundings of the vehicle.

The controller 44D includes a camera unit controller (not illustrated) that controls the camera unit 20D. The controller 44D causes the camera unit controller to control the imaging condition of the camera unit 20D. However, in the following description "the camera unit controller" will be omitted. The controller 44D performs the same process as performed by the imaging controller 33C of the ninth embodiment.

For example, the controller 44D causes the electronic mirror monitors to display videos in which luminance is changed by changing only the aperture value as the imaging condition.

Furthermore, for example, the controller 44D may cause the electronic mirror monitors to display videos in which luminance is changed by changing only the sensitivity as the imaging condition.

Moreover, for example, the controller 44D may cause the electronic mirror monitors to display videos in which luminance is changed by changing each of the aperture value, the shutter speed, and the sensitivity as the imaging condition.

A flow of processes performed by the control device 40D will be described below. The control device 40D performs the same process as in the flowchart illustrated in FIG. 20 of the ninth embodiment.

As described above, in the present embodiment, when the vehicle travels in the lighting device installed place, the imaging condition of the camera unit 20D is changed in accordance with the illuminance pattern of the lighting device installed place. In the present embodiment, when the vehicle travels in the lighting device installed place, by changing the imaging condition in accordance with a change of the illuminance around the vehicle, it is possible to suppress deterioration of the visibility of a video displayed on the electronic mirror 10D. In other words, according to the present embodiment, when the vehicle travels in the lighting device installed place, it is possible to maintain high visibility of the video displayed on the electronic mirror 10D independently of the change of the illuminance around the vehicle.

According to the present embodiment, when the vehicle travels in the lighting device installed place, the imaging condition is appropriately controlled in accordance with the illuminance, so that even when the illuminance around the vehicle is changed, it is possible to display a video, in which a captured object is clearly displayed, on the electronic mirror 10D.

In the present embodiment, even in a place, such as in the vicinity of the tunnel exit, in which the illuminance rapidly changes, it is possible to suppress deterioration of the visibility of the video displayed on the electronic mirror 10D.

Fourteenth Embodiment

Figure 29:
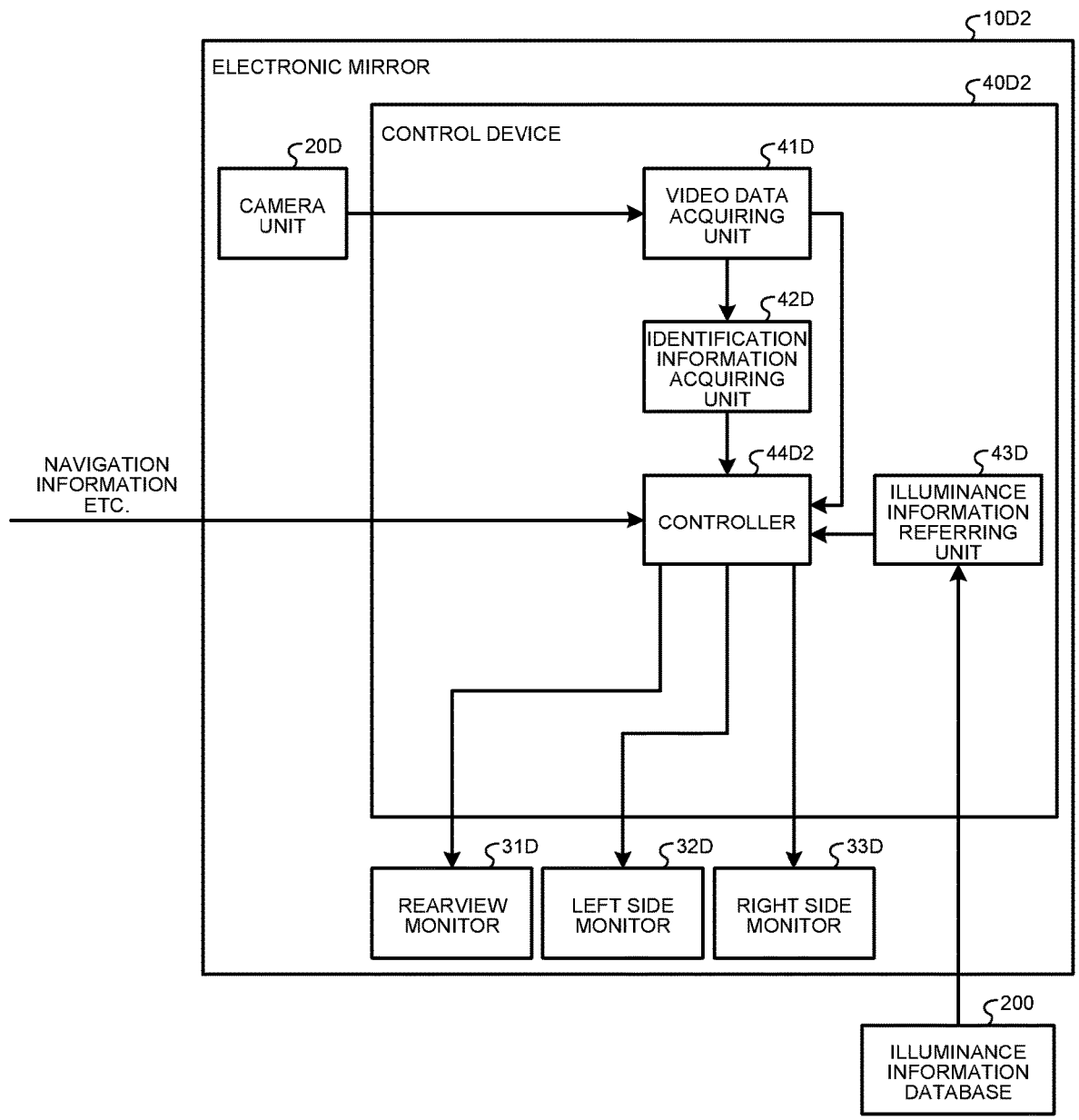
FIG. 29 is a block diagram illustrating a configuration example of an electronic mirror control device according to a fourteenth embodiment.

An electronic mirror 10D2 according to a fourteenth embodiment will be described with reference to FIG. 29. FIG. 29 is a block diagram illustrating a configuration example of an electronic mirror control device according to the fourteenth embodiment. A basic configuration of the electronic mirror 10D2 is the same as the electronic mirror 10D of the thirteenth embodiment. In the following description, the same components as those of the electronic mirror 10D are denoted by the same or corresponding reference symbols, and detailed explanation thereof will be omitted. The same applies to other embodiments below.

In the present embodiment, a control device 40D2 causes a controller 44D2 to control display luminance of the electronic mirror monitors so that videos in which the luminance is changed in accordance with the illuminance at each of positions in the lighting device installed place are displayed on the electronic mirror monitors. The controller 44D2 performs the same process as performed by the display controller 33B of the fifth embodiment.

When the vehicle travels in the lighting device installed place, the controller 44D2 generates a control signal for controlling the luminance of the backlights of the electronic mirror monitors in accordance with the illuminance pattern of the lighting device installed place.

Alternatively, when the vehicle travels in the lighting device installed place, the controller 44D2 generates a display video in which luminance of each of pixels of a video captured by the camera unit 20D is corrected in accordance with the illuminance pattern of the lighting device installed place.

Furthermore, when the vehicle travels in the lighting device installed place, the controller 44D2 may change luminance of the display video as described above only when a background color of the display video is bright.

A flow of processes performed by the control device 40D2 will be described below. The control device 40D2 performs the same process as in the flowchart illustrated in FIG. 13 of the fifth embodiment.

As described above, in the present embodiment, when the vehicle travels in the lighting device installed place, the luminance of the display videos displayed on the electronic mirror monitors is changed in accordance with the illuminance pattern of the lighting device installed place. In the present embodiment, when the vehicle travels in the lighting device installed place, by changing the luminance of the display videos in accordance with a change of the illuminance around the vehicle, it is possible to suppress deterioration of the visibility of the electronic mirror 10D. In other words, according to the present embodiment, when the vehicle travels in the lighting device installed place, it is possible to maintain high visibility of the electronic mirror 10D independently of the change of the illuminance around the vehicle.

Fifteenth Embodiment

An electronic mirror 10D according to a fifteenth embodiment will be described. A basic configuration of the electronic mirror 10D is the same as the electronic mirror 10D of the thirteenth embodiment or the electronic mirror 10D2 of the fourteenth embodiment. The electronic mirror 10D refers to the same illuminance information database 200 as that of the second embodiment.

The control device 40D performs control so as to change the imaging condition of the camera unit 20D in accordance with the illuminance at each of positions in the lighting device installed place and the light source type of the lighting devices, to thereby change luminance of each of pixels of a captured video. Alternatively, the control device 40D may cause the controller 44D to change the luminance of each of pixels of the video captured the camera unit 20D, in accordance with the illuminance at each of positions in the lighting device installed place and the light source type of the lighting devices. The controller 44D performs the same process as performed by the imaging controller 33C of the tenth embodiment.

When the vehicle travels in the lighting device installed place, the controller 44D performs control so as to change the imaging condition of the camera unit 20D in accordance with the illuminance at each of positions in the lighting device installed place and the light source type of the lighting devices.

A flow of processes performed by the control device 40D will be described below. The control device 40D performs the same process as in the flowchart illustrated in FIG. 21 of the tenth embodiment.

As described above, in the present embodiment, when the vehicle travels in the lighting device installed place, the electronic mirror monitors are controlled so as to display videos in which the luminance and the white balance are changed in accordance with a change of the illuminance around the vehicle and the light source type. Therefore, in the present embodiment, it is possible to suppress deterioration of the visibility of the electronic mirror 10D. In other words, according to the present embodiment, when the vehicle travels in the lighting device installed place, it is possible to maintain high visibility of the electronic mirror 10D independently of a change of the illuminance around the vehicle and the light source type.

Sixteenth Embodiment

Figure 30:
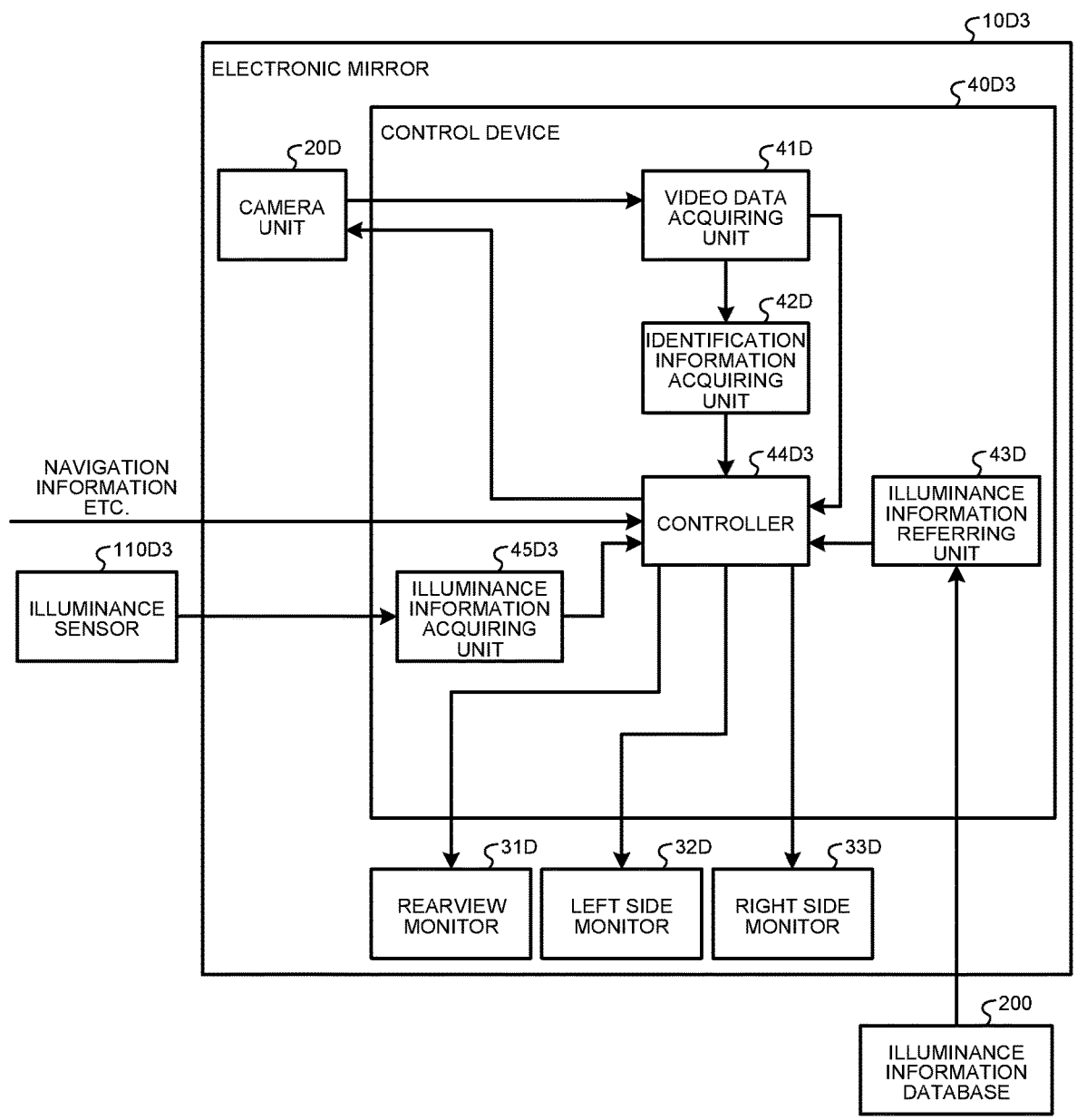
FIG. 30 is a block diagram illustrating a configuration example of an electronic mirror control device according to a sixteenth embodiment.

An electronic mirror 10D3 according to a sixteenth embodiment will be described with reference to FIG. 30. FIG. 30 is a block diagram illustrating a configuration example of an electronic mirror control device according to the sixteenth embodiment. A basic configuration of the electronic mirror 10D3 is the same as the electronic mirror 10D of the thirteenth embodiment. The electronic mirror 10D3 includes an illuminance sensor 110D3 that is the same as the illuminance sensor 110A of the third embodiment.

The electronic mirror 10D3 is different from the thirteenth embodiment in that a control device 40D3 includes an illuminance information acquiring unit 45D3 and a controller 44D3 performs a different process. The illuminance information acquiring unit 45D3 is configured in the same manner as the illuminance information acquiring unit 34A of the third embodiment.

At a position at which the illuminance of the illuminance information acquired from the referred illuminance information database 200 and the illuminance of the measurement result of the illuminance sensor 110D3 are different, the controller 44D3 performs control so as to change luminance of display videos displayed by the electronic mirror monitors in accordance with the illuminance of the measurement result, based on the illuminance information referred to by the illuminance information referring unit 43D, the identification information acquired by the identification information acquiring unit 42D, and the measurement result acquired by the illuminance information acquiring unit 45D3. The controller 44D3 performs the same process as performed by the imaging controller 33C2 of the eleventh embodiment.

A flow of processes performed by the control device 40D3 will be described below. The control device 40D3 performs the same process as in the flowchart illustrated in FIG. 23 of the eleventh embodiment.

As described above, in the present embodiment, at the position at which the illuminance in the referred illuminance information database 200 and the illuminance measured by the illuminance sensor 110D3 are different, the imaging condition is controlled so as to change the luminance of the display videos displayed on the electronic mirror monitors in accordance with the illuminance measured by the illuminance sensor 110D3. In the present embodiment, it is possible to appropriately suppress deterioration of the visibility of the electronic mirror 10D3 due to a change of the illuminance around the vehicle.

Seventeenth Embodiment

An electronic mirror 10D according to a seventeenth embodiment will be described. The electronic mirror 10D is different from the thirteenth embodiment mainly in that the controller 44D performs a different process. The electronic mirror 10D of the present embodiment refers to the same illuminance information database 200 as that of the fourth embodiment.

When the vehicle travels in the lighting device installed place, and when the lighting devices are turned on, the controller 44D performs control so as to change the luminance of the display videos displayed on the electronic mirror monitors in accordance with the illuminance pattern of the lighting device installed place. The controller 44D performs the same process as performed by the imaging controller 33C of the thirteenth embodiment.

A flow of processes performed by the control device 40D will be described below. The control device 40D performs the same process as in the flowchart illustrated in FIG. 25 of the twelfth embodiment.

As described above, in the present embodiment, even when the lighting device installed place is a place in which the lighting devices are turned on only at night or in dark surroundings, it is possible to appropriately suppress deterioration of the visibility of the electronic mirror 10D.

While the HUD device 10, the on-vehicle display device 10B, the on-vehicle imaging device 10C, and the electronic mirror 10D according to the present application have been described above, the present application may be embodied in various different forms other than the above-described embodiments.

The components of the HUD device 10, the on-vehicle display device 10B, the on-vehicle imaging device 10C, and the electronic mirror 10D illustrated in the drawings are functionally conceptual and need not necessarily be physically configured in the manner illustrated in the drawings. In other words, specific forms of distribution and integration of the devices are not limited to those illustrated in the drawings, and all or part of the devices may be functionally or physically distributed or integrated in arbitrary units depending on various loads or use conditions.

The configurations of the HUD device 10, the on-vehicle display device 10B, the on-vehicle imaging device 10C, and the electronic mirror 10D are realized as software by, for example, a program or the like loaded on a memory. In the embodiments described above, it is explained that the functional blocks are implemented by cooperation with hardware or software. In other words, the functional blocks are realized in various forms using only hardware, using only software, or using a combination of hardware and software.

The components described above include one that can easily be thought of by a person skilled in the art and one that is practically identical. Further, the configurations described above may be combined appropriately. Furthermore, within the scope not departing from the gist of the present application, various omission, replacement, and modifications of the components may be made.

While it is explained that the identification information acquiring unit 31 and the identification information acquiring unit 42D are the character recognition units, the identification information acquiring unit 31 and the identification information acquiring unit 42D may be any unit that acquires information for identifying a lighting device installed place, such as a two-dimensional code, a pattern, or information provided in a road in the vicinity of a tunnel.

It may be possible to store, in the illuminance information database 200, illuminance of a single lighting device and an installation interval of the lighting device as the illuminance information indicating illuminance at each of positions, and calculate the illuminance at each of the positions in the lighting device installed place. For example, it may be possible to store, as the illuminance information indicating the illuminance at each of the positions, illuminance per lighting device, the installation interval of the lighting device in the lighting device installed place, and a total length of the lighting device installed place, and calculate illuminance corresponding to a distance from an end of the lighting device installed place on the entrance side.

While it is explained that the luminance control device 30, the luminance control device 30B, the imaging control device 30C, and the control device 40D acquire the current location information on the vehicle from the navigation system, embodiments are not limited thereto. The luminance control device 30, the luminance control device 30B, the imaging control device 30C, and the control device 40D may include a current location information acquiring unit that acquires the current location information on the vehicle that is acquired by a global positioning system (GPS) receiver mounted on the vehicle.

The projection device 20 may reflect a display video projected on the projector 21 on the windshield S without using the combiner and allow a viewer to recognize the display video as a virtual image.

In the vicinity of the entrance and the exit of the tunnel, the display controller 33B may perform control so as to change the luminance of the display video displayed on the display unit 20B, based on a total illuminance obtained by adding illuminance of external light measured by the illuminance sensor 110B2 and the illuminance of the illuminance information acquired from the illuminance information database 200 while changing a ratio thereof depending on a position. More specifically, at a position within several tens of meters from the end of the tunnel, the display controller 33B performs control so as to change the luminance of the display video displayed on the display unit 20B based on the total illuminance obtained with increasing the ratio of the illuminance of the external light measured by the illuminance sensor 110B2 and decreasing the ratio of the illuminance of the illumination information, according to an increase in the distance toward the end of the tunnel. With this configuration, in the vicinity of the entrance and the exit of the tunnel, it is possible to more appropriately change the luminance of the display video displayed on the display unit 20B.

The display unit 20B may be an instrument panel in which mechanical instruments are arranged and which has a backlight. In this case, when the vehicle travels in the lighting device installed place, the display controller 33B performs control so as to change the luminance of the backlight of the display unit 20B in accordance with the illuminance pattern of the lighting device installed place. More specifically, the display controller 33B performs control so as to change the luminance of the backlight of the display unit 20B in accordance with the illuminance of the current location of the vehicle, based on the current location information on the vehicle and the illuminance pattern of the lighting device installed place. Therefore, when the vehicle travels in the lighting device installed place, even when the display unit 20B is an instrument panel in which mechanical instruments are arranged, it is possible to suppress deterioration of the visibility of the on-vehicle display device 10B by changing the luminance of the backlight of the display unit 20B in accordance with a change of the illuminance around the vehicle.

The on-vehicle imaging device 10C may be an on-vehicle imaging storage device that stores therein a video captured by the camera 20C.

According to the present application, it is possible to suppress deterioration of visibility.

Although the application has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A luminance control device comprising:
    an illuminance information referring unit configured to refer to an illuminance information database that stores therein a definition of an illuminance pattern indicating illuminance at respective positions of a lighting device installed place in which lighting devices are installed;
    an identification information acquiring unit configured to acquire identification information that identifies the lighting device installed place in which a vehicle travels; and
    a display controller configured to control a display device that is arranged in the vehicle and that displays information to be provided to a driver, wherein
    the display controller is further configured to control a luminance of the display device such that the luminance of the display device is changed according to the illuminance pattern as the vehicle travels in the lighting device installed place based on the identification information, acquired by the identification information acquiring unit, of the lighting device installed place in which the vehicle travels and the illuminance pattern of the lighting device installed place, acquired by the illuminance information acquiring unit, corresponding to the identification information.

2. The luminance control device according to claim 1, wherein the identification information acquiring unit is a character recognition unit configured to acquire the identification information by recognizing characters that are included as a captured object in front video data captured by a front camera that captures a front of the vehicle.

3. The luminance control device according to claim 1, wherein
    the definition of the illuminance pattern includes a definition of a light source type of the lighting devices, and
    the display controller is further configured to control the luminance of the display device further in accordance with the light source type.

4. The luminance control device according to claim 1, further comprising
    an illuminance information acquiring unit configured to acquire a measurement result from a measuring unit that measures illuminance around the vehicle, wherein
    the display controller is further configured to, at a position at which the illuminance of the illuminance pattern and the illuminance of the measurement result are different, control the luminance of the display device in accordance with the illuminance of the measurement result based on the illuminance pattern referred to by the illuminance information referring unit, the identification information acquired by the identification information acquiring unit, and the measurement result acquired by the illuminance information acquiring unit.

5. A head-up display device comprising:
    the luminance control device according to claim 1; and
    a projection device serving as the display device on which a virtual image is projected by a projector of the head-up display device.

6. An on-vehicle display device comprising:
    the luminance control device according to claim 1; and
    the display unit.

* * * * *